US012308486B2

(12) United States Patent
Fujii et al.

(10) Patent No.: US 12,308,486 B2
(45) Date of Patent: May 20, 2025

(54) FUEL CELL MODULE, FUEL CELL STACK, AND MANUFACTURING METHOD OF FUEL CELL MODULE

(71) Applicant: Panasonic Intellectual Property Management Co., Ltd., Osaka (JP)

(72) Inventors: Tsutomu Fujii, Osaka (JP); Yoshifumi Taguchi, Osaka (JP); Yasumichi Yoshihara, Osaka (JP); Kozue Kuniyoshi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 553 days.

(21) Appl. No.: 17/312,588

(22) PCT Filed: Nov. 28, 2019

(86) PCT No.: PCT/JP2019/046603
§ 371 (c)(1),
(2) Date: Jun. 10, 2021

(87) PCT Pub. No.: WO2020/121830
PCT Pub. Date: Jun. 18, 2020

(65) Prior Publication Data
US 2021/0336279 A1  Oct. 28, 2021

(30) Foreign Application Priority Data
Dec. 11, 2018 (JP) .................. 2018-231860
Apr. 2, 2019 (JP) .................. 2019-070624

(51) Int. Cl.
*H01M 8/0271* (2016.01)
*H01M 8/1004* (2016.01)

(52) U.S. Cl.
CPC ....... *H01M 8/0271* (2013.01); *H01M 8/1004* (2013.01)

(58) Field of Classification Search
None
See application file for complete search history.

(56) References Cited

U.S. PATENT DOCUMENTS

2005/0181263 A1  8/2005 Tsugane
2009/0286121 A1* 11/2009 Morimoto ........... H01M 8/1004
429/494
(Continued)

FOREIGN PATENT DOCUMENTS

JP  10-154521    6/1998
JP  2005-235736  9/2005
(Continued)

OTHER PUBLICATIONS

English translation of the International Preliminary Report on Patentability issued Jun. 24, 2021 in International Application No. PCT/JP2019/046603.
(Continued)

*Primary Examiner* — Brian R Ohara
*Assistant Examiner* — Patrick Marshall Greene
(74) *Attorney, Agent, or Firm* — Wenderoth, Lind & Ponack, L.L.P.

(57) ABSTRACT

A fuel cell module that suppress deterioration of an electrolyte membrane is provided. The fuel cell module includes a membrane-electrode assembly (MEA) including a polymer electrolyte membrane, an anode catalyst layer disposed on a surface of the membrane, a cathode catalyst layer disposed on the other surface of the membrane, and a pair of gas diffusion layers laminated on the anode catalyst layer and the cathode catalyst layer respectively, a pair of separators sandwiching the MEA; and a sealing member sealing the MEA and each of the pair of separators together. One gas diffusion layer and the sealing member overlaps in a thickness direction within a region including a center-side edge of the sealing member, and the one gas diffusion layer is
(Continued)

notched through in the thickness direction at a part of a portion corresponding to the region.

7 Claims, 23 Drawing Sheets

(56) References Cited

U.S. PATENT DOCUMENTS

| | | | | |
|---|---|---|---|---|
| 2011/0097647 | A1* | 4/2011 | Iju | H01M 8/0286 264/279 |
| 2013/0108942 | A1 | 5/2013 | Sugiura et al. | |
| 2013/0154150 | A1* | 6/2013 | Shimazoe | H01M 8/0286 264/161 |
| 2017/0229718 | A1 | 8/2017 | Taguchi et al. | |
| 2021/0126267 | A1* | 4/2021 | Stahl | H01M 8/0286 |

FOREIGN PATENT DOCUMENTS

| | | |
|---|---|---|
| JP | 2007-503688 | 2/2007 |
| JP | 2009-217999 | 9/2009 |
| JP | 2013-098044 | 5/2013 |
| JP | 6149260 | 6/2017 |
| WO | 2005/020356 | 3/2005 |

OTHER PUBLICATIONS

International Search Report issued Feb. 10, 2020 in International (PCT) Application No. PCT/JP2019/046603 with English translation.

* cited by examiner

FUEL CELL MODULE, FUEL CELL STACK, AND MANUFACTURING METHOD OF FUEL CELL MODULE

TECHNICAL FIELD

The present disclosure relates to a fuel cell module and a fuel cell stack, and a method of manufacturing the fuel cell module.

BACKGROUND ART

In a fuel cell module described in Patent Document 1, a membrane-electrode assembly is sandwiched by a pair of separators, with the membrane-electrode assembly and each of the pair of separators being bonded and integrally joined together by a resin portion containing fibers at least in part.

A fuel cell module described in Patent Document 2 includes a protective layer formed at a peripheral end of an electrode layer and has an overlapping portion where the electrode layer and the protective layer overlap in the thickness direction.

PATENT DOCUMENT

Patent Document 1: JP-6149260
Patent Document 2: JP-A-2009-217999

SUMMARY OF THE INVENTION

In recent years, fuel cell modules suppressing breakage of or deterioration of an electrolyte membrane have been demanded.

A fuel cell module of the present disclosure includes: a membrane-electrode assembly including a polymer electrolyte membrane, an anode catalyst layer disposed on a first main surface of the polymer electrolyte membrane, a cathode catalyst layer disposed on a second main surface of the polymer electrolyte membrane, and a pair of gas diffusion layers, one of which is laminated on the anode catalyst layer and the other of which is laminated on the cathode catalyst layer; a pair of separators sandwiching the membrane-electrode assembly therebetween; and a sealing member bonding and sealing the membrane-electrode assembly and each of the pair of separators together. One gas diffusion layer of the pair of gas diffusion layers and the sealing member overlaps in a thickness direction within a region including a center-side edge of the sealing member, and the one gas diffusion layer is notched through in the thickness direction at a part of a portion corresponding to the region.

A fuel cell stack of the present disclosure includes a plurality of the above mentioned fuel cell modules.

A method of manufacturing a fuel cell module of the present disclosure, includes: a gas diffusion layer processing step of reducing the volume of at least a part of an outer peripheral portion in one gas diffusion layer of a pair of gas diffusion layers; an arrangement step of arranging a membrane-electrode assembly including the pair of gas diffusion layers and a sealing member such that the outer peripheral portion overlaps at least partly with the sealing member in a thickness direction; and a bonding step of sandwiching the sealing member and the membrane-electrode assembly by a pair of separators to bond the membrane-electrode assembly and the pair of separators together.

According to the present disclosure there can be provided a fuel cell module, a fuel cell stack and a method of manufacturing the fuel cell module that suppress breakage of or deterioration of the electrolyte membrane.

EMBODIMENT(S) FOR CARRYING OUT THE INVENTION

Background to this Disclosure

A polymer electrolyte fuel cell is a device that generates electricity and heat at the same time by electrochemically reacting fuel gas containing hydrogen with oxidizer gas containing oxygen such as air. Hereinafter, the polymer electrolyte fuel cell is referred to as PEFC. A basic configuration of the PEFC is shown in a sectional view of FIG. 26. The PEFC includes an electrolyte membrane 1500 that selectively transports hydrogen ions and an anode electrode 1900 and a cathode electrode 2000 that are formed on both surfaces of the electrolyte membrane 1500.

The anode electrode 1900 includes an anode catalyst layer 1600 formed on a first main surface 1510 of the electrolyte membrane 1500 and an anode gas diffusion layer 1810 laminated outside the anode catalyst layer 1600. The cathode electrode 2000 includes a cathode catalyst layer 1700 formed on a second main surface 1520 of the electrolyte membrane 1500 and a cathode gas diffusion layer 1820 laminated outside the cathode catalyst layer 1700. The anode gas diffusion layer 1810 and the cathode gas diffusion layer 1820 have functions of ensuring breathability and electrical conductivity.

In this manner, the electrolyte membrane 1500 and the electrodes 1900 and 2000 are integrally joined and assembled into a membrane-electrode assembly 1000. Hereinafter, the membrane-electrode assembly may sometimes be referred to as MEA.

Figure 27:
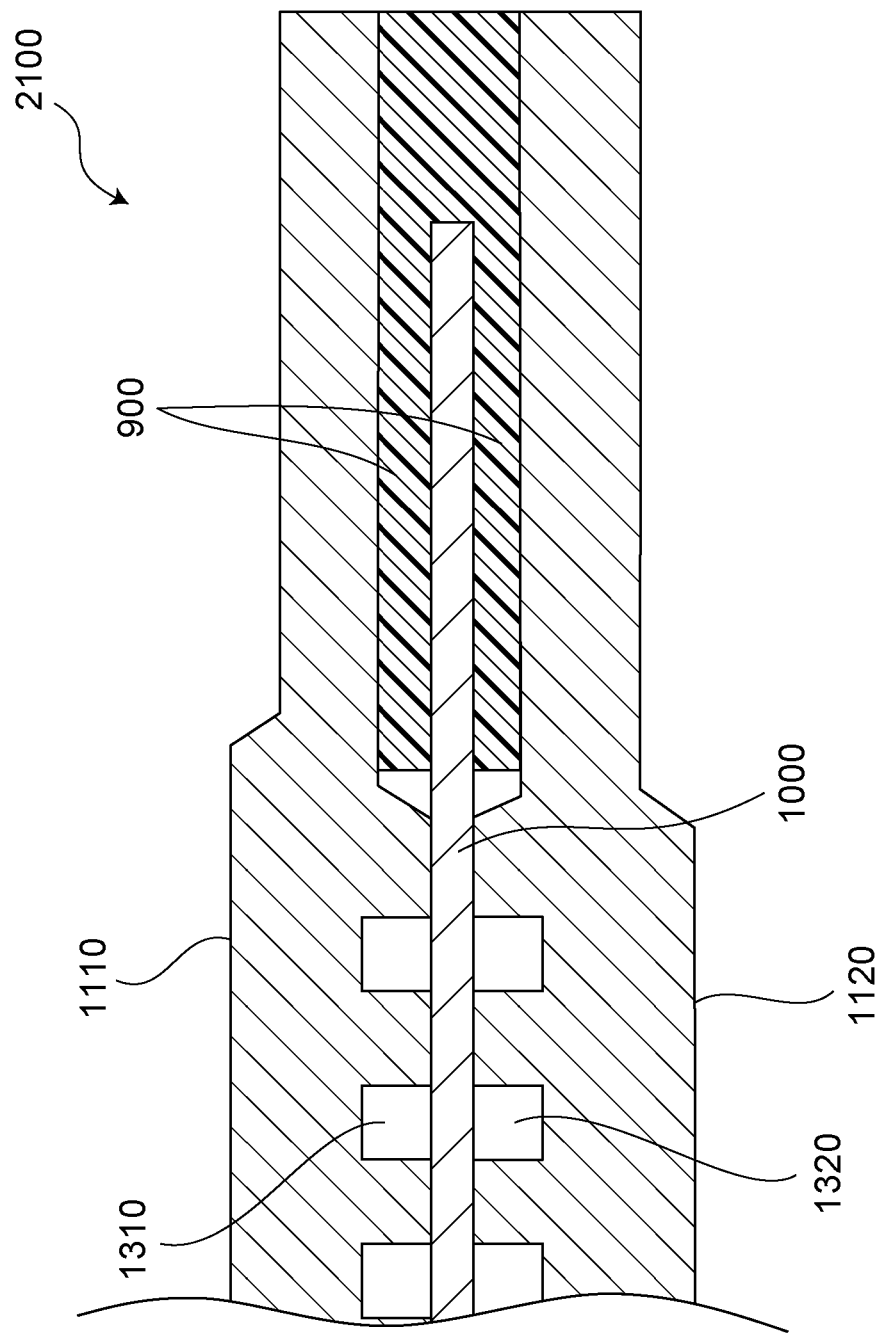
FIG. 27 is a partial sectional view of a conventional fuel cell module.

A sectional view of the MEA 1000 is shown in FIG. 27. An anode separator 1110 is disposed toward the anode electrode 1900 of the MEA 1000, while a cathode separator 1120 is disposed toward the cathode electrode 2000 of the MEA 1000. The anode separator 1110 and the cathode separator 1120 mechanically sandwich and fix the MEA 1000 therebetween. A structure obtained by sandwiching the MEA 1000 by the pair of separators 1110 and 1120 in this manner is a fuel cell module (single-cell module) 2100. The separators 1110 and 1120 are members for electrically connecting the adjoining fuel cell modules 2100 to one another in series. The anode separator 1110 has at its portion in contact with the MEA 1000 a gas flow path groove 1310 for supplying reaction gas to the anode electrode 1900 and carrying away generated water and excess gas. Similarly, a gas flow path groove 1320 is formed at a portion of the cathode separator 1120 that is in contact with the MEA 1000.

By the way, improving the utilization efficiency of reaction gas is one of important issues of the fuel cells. Factors decreasing the utilization efficiency include external gas leak, gas cross leak, and gas shortcut.

To supply reaction gas to the gas flow path grooves 1310 and 1320, manifold holes are disposed in edge portions of the separators 1110 and 1120 to distribute reaction gas. Furthermore, to prevent reaction gas, etc. supplied to the gas flow path grooves 1310 and 1320 from leaking to the exterior or from mixing, a sealing member 900 is arranged between the pair of separators 1110 and 1120 so as to surround the outer periphery of an electrode forming portion, i.e. a power generating region of the MEA 1000.

Figure 26:
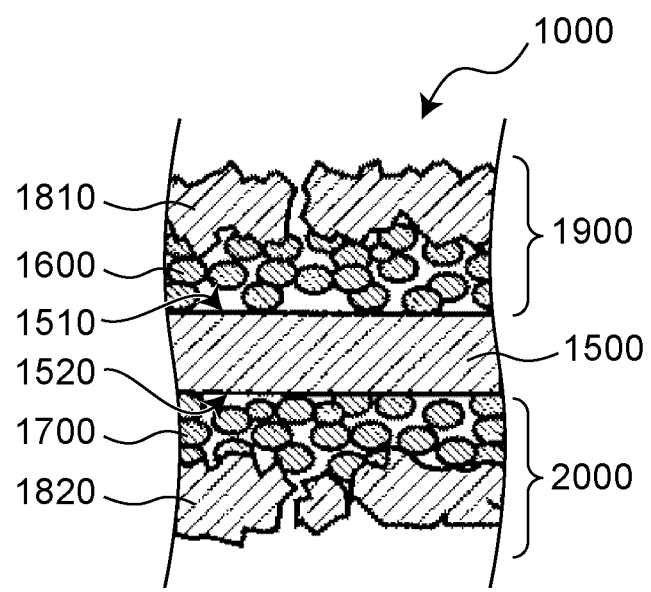
FIG. 26 is a sectional view of constituent members of a conventional polymer electrolyte fuel cell.

A frame is fitted on an outer edge of the MEA 1000 shown in FIG. 26. The sealing member 900 (gasket) is fitted on the outer edge (peripheral edge portion) of the MEA 1000. The separators 1110 and 1120 with electrical conductivity are arranged on both sides in the thickness direction of the MEA 1000. A resin frame for holding the MEA 1000 and an elastic seal are used for the sealing member 900 lying between the separators 1110 and 1120. In this case, a gap between the resin frame and the electrolyte membrane 1500 needs to be filled with the elastic seal, requiring high component dimensional accuracy and assembling accuracy. Therefore, the seal shape becomes complicated so that no gap is generated within the tolerance range and the elastic seal is hard to thin in order to prevent the tolerance from becoming too small. Although size reduction or thickness reduction is required for the fuel cell stack in which the plurality of fuel cell modules 2100 are stacked and connected in series to obtain high voltage, the size reduction or the thickness reduction is difficult to implement in the case of using the resin frame and the elastic seal as the sealing member 900. Thus, a method as in Patent Document 1 is known where a thin module is implemented by using an insulating thermosetting resin as the sealing member 900.

When the electrolyte membrane 1500 or the anode catalyst layer 1600 and the cathode catalyst layer 1700 are directly exposed to reaction gas at the end portion in the plane direction of the MEA 1000, deterioration of the electrolyte membrane 1500 is accelerated, which affects durability. For this reason, there is also a method as in Patent Document 2 where a protective layer is formed as the sealing member so as not to allow exposure of the electrolyte membrane 1500, the anode catalyst layer 1600, and the cathode catalyst layer 1700.

In the case of Patent Document 2, however, since the protective layer (sealing member) has an overlapping portion overlapping with the electrode layer (gas diffusion layer), stress may concentrate on the separators and the electrolyte membrane at the overlapping portion where the protective layer and the electrode layer overlap when a load is applied to the MEA sandwiched by the separators, resulting in breakage of the separators or rapture of the electrolyte membrane. Furthermore, in the case where the protective layer is designed to have a step to avoid stress concentration or where the electrode layer is designed in dimensions so that there is no overlap with the protective layer, exposure of the electrolyte membrane and electrode layers may remain due to alignment and assembly tolerances.

The inventors have thus obtained the following findings as a result of diligent study to suppress deterioration of the electrolyte membrane by preventing stress concentration on the separators and electrolyte membrane even when the electrode layer and the protective layer have an overlapping portion.

In the fuel cell module having the MEA as in Patent Document 2, a load is applied in the state where the sealing member and the gas diffusion layer have an overlapping portion, stress concentration may occur on constituent members such as separators and electrolyte membrane of the fuel cell module. To cope with this, it is conceivable for example to make the material of the overlapping portion overlapping with the sealing member in the gas diffusion layer softer than the material of the non-overlapping portion not overlapping with the sealing member. However, due to difficulty of producing the overlapping portion from a different material from that of the non-overlapping portion in the gas diffusion layer, problems occur such as increased production cost of the gas diffusion layer.

To deal with this, the inventors have found a configuration in which a void (space) is formed in the outer peripheral portion of the gas diffusion layer. Specifically, the inventors have found a configuration in which the gas diffusion layer and the sealing member are overlapped in a region including an edge toward an opening of the sealing member having the opening, wherein a void passing through in the thickness direction is formed in at least a part of the portion overlapping with the sealing member in the gas diffusion layer. This allows formation of a void for the gas diffusion layer to deform in the plane direction. This enables the gas diffusion layer to deform toward the void when the gas diffusion layer is subjected to a load in the thickness direction. Thus, the inventors have found that stress concentration on the constituent members can be prevented even if a load is applied in the state where the gas diffusion layer overlaps in the thickness direction with the portion laminated on the gas diffusion layer. As a result, the inventors have found that deterioration of the electrolyte membrane can be suppressed by preventing stress concentration on the constituent members even when the outer peripheral portion of the gas diffusion layer and the sealing member have an overlapping portion.

Based on these novel findings, the inventors have reached the following invention.

A fuel cell module according to the first aspect of the present disclosure, includes: a membrane-electrode assembly including a polymer electrolyte membrane, an anode catalyst layer disposed on a first main surface of the polymer electrolyte membrane, a cathode catalyst layer disposed on a second main surface of the polymer electrolyte membrane, and a pair of gas diffusion layers, one of which is laminated on the anode catalyst layer and the other of which is laminated on the cathode catalyst layer; a pair of separators sandwiching the membrane-electrode assembly therebetween; and a sealing member bonding and sealing the membrane-electrode assembly and each of the pair of separators together. One gas diffusion layer of the pair of gas diffusion layers and the sealing member overlaps in a thickness direction within a region including a center-side edge of the sealing member, and the one gas diffusion layer is notched through in the thickness direction at a part of a portion corresponding to the region.

With such a configuration, a space for the first diffusion layer to deform in the plane direction can be formed by notching through in the thickness direction a part of a portion (inner region) corresponding to the region in one gas diffusion layer. This enables the first diffusion layer to deform toward the space when a load acts in the thickness direction on the first diffusion layer. This enables prevention of stress concentration on the constituent members even if a load is applied in the state where the gas diffusion layer and the sealing member overlap in the thickness direction. As a result, deterioration of the polymer electrolyte membrane can be suppressed by preventing stress concentration on the constituent members even when the outer peripheral portion of the gas diffusion layer and the sealing member overlap.

The fuel cell module according to the second aspect of the present disclosure, wherein the one gas diffusion layer may have at the portion corresponding to the region a plurality of through-holes passing through in the thickness direction.

With such a configuration, the first diffusion layer can deform toward the through-holes when a load acts in the thickness direction on the first diffusion layer.

The fuel cell module according to the third aspect of the present disclosure, wherein the one gas diffusion layer may have at the portion corresponding to the region a serrated portion formed in a saw teeth shape in plan view.

With such a configuration, the first diffusion layer can deform toward the space defined along the serrated portion when a load acts in the thickness direction on the first diffusion layer.

The fuel cell module according the fourth aspect of the present disclosure, wherein the pair of gas diffusion layers are an anode gas diffusion layer laminated on the anode catalyst layer and a cathode gas diffusion layer laminated on the cathode catalyst layer, the pair of separators are an anode separator arranged toward the anode gas diffusion layer of the membrane-electrode assembly and a cathode separator arranged toward the cathode gas diffusion layer of the membrane-electrode assembly, the cathode separator and the anode separator in pairs sandwiching the membrane-electrode assembly therebetween. The sealing member includes: an anode sealing member having an opening portion, the anode sealing member bonding and sealing the membrane-electrode assembly and the anode separator together; and a cathode sealing member having an opening portion, the cathode sealing member bonding and sealing the membrane-electrode assembly and the cathode separator together. When viewed from a direction perpendicular to the first main surface, the anode gas diffusion layer has an anode-side inner region overlapping the anode sealing member at a region including an edge toward the opening portion of the anode sealing member, when viewed from the direction perpendicular to the first main surface, the cathode gas diffusion layer has a cathode-side inner region overlapping the cathode sealing member at a region including an edge toward the opening portion of the cathode sealing member. The anode gas diffusion layer has a void passing through in the thickness direction of the anode gas diffusion layer in at least a part including the anode-side inner region, the cathode gas diffusion layer has a void passing through in the thickness direction of the cathode gas diffusion layer in at least a part including the cathode-side inner region, and when viewed from the direction perpendicular to the first main surface, the anode-side inner region and the cathode-side inner region do not overlap.

With such a configuration, a void is formed in at least a part of the anode-side inner region and the cathode-side inner region, whereby concentration of stress on the constituent members can be prevented when a load is applied in the thickness direction of the fuel cell module. As a result, breakage or deterioration of the polymer electrolyte membrane can be suppressed.

The fuel cell module according to the fifth aspect of the present disclosure, wherein when viewed from the direction perpendicular to the first main surface, the anode-side inner region may have an outer portion lying outside of the cathode-side inner region and an inner portion lying inside of the cathode-side inner region.

With such a configuration, the anode-side inner region and the cathode-side inner region do not overlap, with the result that stress concentration can be prevented when a load is applied in the thickness direction of the fuel cell module.

The fuel cell module according to the sixth aspect of the present disclosure, wherein at least one of the void formed in the anode gas diffusion layer and the void formed in the cathode gas diffusion layer may include a plurality of through-holes.

With such a configuration, the gas diffusion layer can deform toward the through-holes when a load is applied in the thickness direction of the fuel cell module, whereupon stress concentration can be prevented.

The fuel cell module according to the seventh aspect of the present disclosure, wherein at least one of the void formed in the anode gas diffusion layer and the void formed in the cathode gas diffusion layer may be formed by a saw-toothed notch when viewed from the direction perpendicular to the first main surface.

With such a configuration, the gas diffusion layer can deform toward notches of the serrated portion when a load is applied in the thickness direction of the fuel cell module, whereupon stress concentration can be prevented.

A fuel cell stack according to the eighth aspect of the present disclosure may include a plurality of the fuel cell modules according to any one of the first to seventh aspects connected in series.

With such a configuration, stress concentration on the constituent members of the fuel cell stack can be prevented so that a highly durable fuel cell stack can be provided.

A method of manufacturing a fuel cell module according to the ninth aspect of the present disclosure, includes: a gas diffusion layer processing step of reducing the volume of at least a part of an outer peripheral portion in one gas diffusion layer of a pair of gas diffusion layers; an arrangement step of arranging a membrane-electrode assembly including the pair of gas diffusion layers and a sealing member such that the outer peripheral portion overlaps at least partly with the sealing member in a thickness direction; and a bonding step of sandwiching the sealing member and the membrane-electrode assembly by a pair of separators to bond the membrane-electrode assembly and the pair of separators together.

With such a configuration, even when the outer peripheral portion of the gas diffusion layer and the sealing member overlap, stress concentration on the constituent members can be prevented so that deterioration of the polymer electrolyte membrane can be suppressed.

The method of manufacturing a fuel cell module according to the tenth aspect of the present disclosure, may include: a preparation step of preparing a polymer electrolyte membrane having a first main surface on which an anode catalyst layer is disposed and a second main surface on which a cathode catalyst layer is disposed, an anode gas diffusion layer and a cathode gas diffusion layer, an anode separator and a cathode separator, and an anode sealing member and a cathode sealing member. At the gas diffusion layer processing step, a void is formed in at least a part of each of outer peripheral portions of the anode gas diffusion layer and the cathode gas diffusion layer 18C. At the arrangement step, the anode gas diffusion layer is laminated on the side where the anode catalyst layer is disposed of the polymer electrolyte membrane, while the cathode gas diffusion layer is laminated on the side where the cathode catalyst layer is disposed, to form a membrane-electrode assembly, and the anode sealing member is arranged so as to overlap at least a part of the outer peripheral portion of the anode gas diffusion layer, while the cathode sealing member is arranged so as to overlap at least a part of the outer peripheral portion of the cathode gas diffusion layer. At the bonding step, the anode gas diffusion layer of the membrane-electrode assembly and the anode separator are bonded together by the anode sealing member, while the cathode gas diffusion layer of the membrane-electrode assembly and the cathode separator are bonded together by the cathode sealing member, to sandwich the membrane-electrode assembly by the anode separator and the cathode separator.

With such a method, even when the gas diffusion layer and the sealing member have an overlapping region, stress concentration on the constituent members of the fuel cell module can be prevented so that deterioration of the polymer electrolyte membrane can be suppressed.

A fuel cell module and a fuel cell stack, and a manufacturing method of fuel cell module according to embodiments will now be described with reference to the drawings.

First Embodiment

Figure 1:
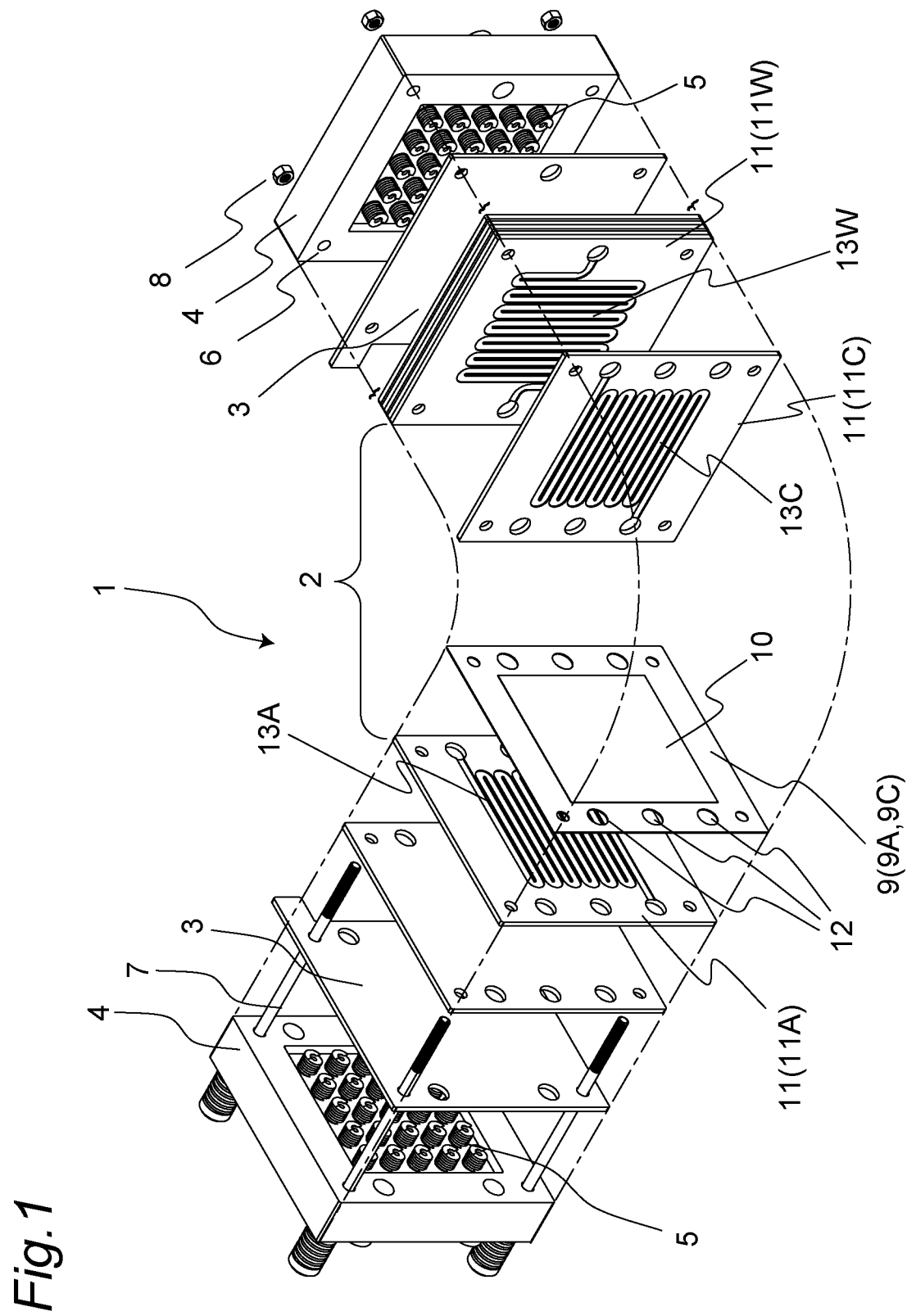
FIG. 1 is an exploded perspective view of a fuel cell stack according to a first embodiment of the present disclosure.
Figure 2:
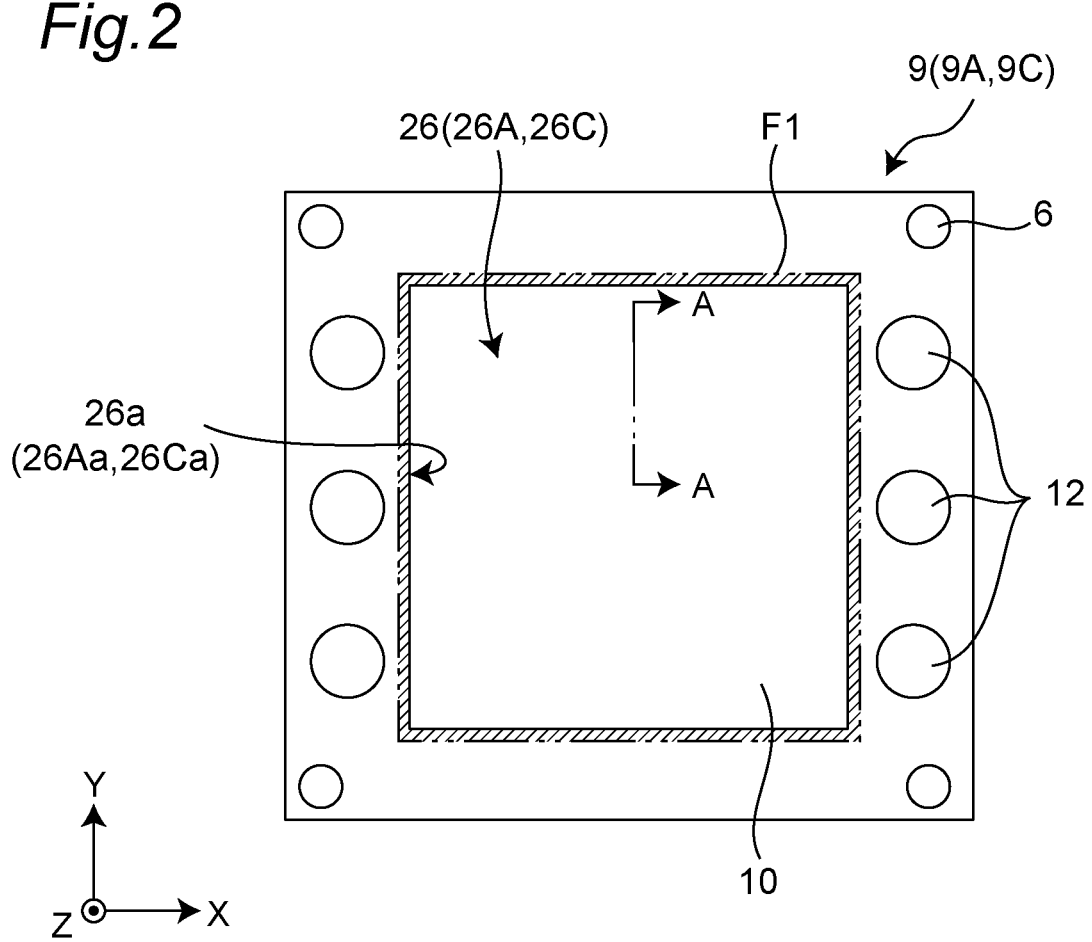
FIG. 2 is a plan view of a membrane-electrode assembly and a sealing member in a fuel cell module according to the first embodiment of the present disclosure.
Figure 3:
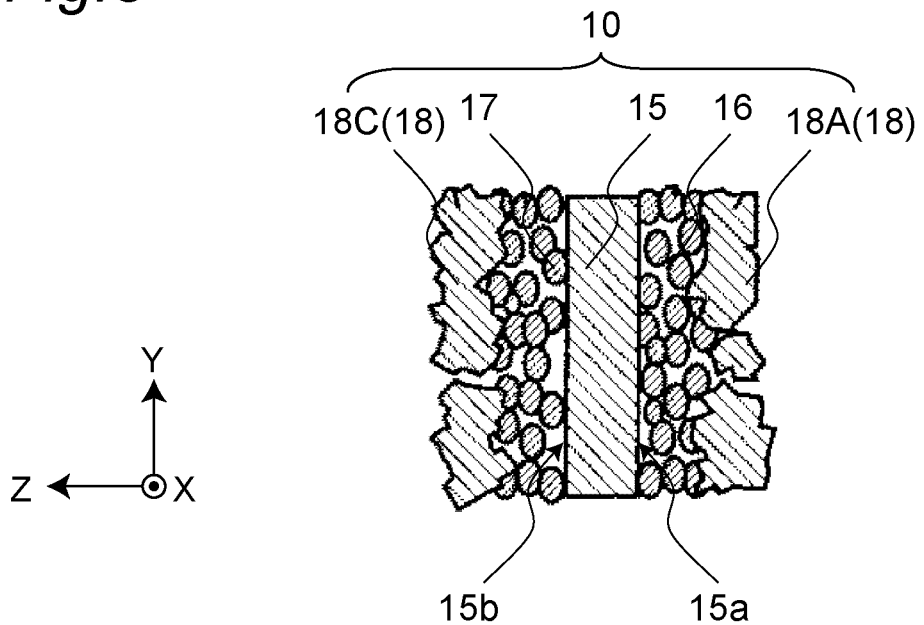
FIG. 3 is a sectional view taken along line A-A of the membrane-electrode assembly of FIG. 2.

FIG. 1 is an exploded perspective view of the fuel cell stack according to a first embodiment. In FIG. 1, the fuel cell stack is partially disassembled and schematically shown. FIG. 2 is a plan view of a membrane-electrode assembly and a sealing member in the fuel cell module according to this embodiment. FIG. 3 is a sectional view taken along line A-A of the membrane-electrode assembly of FIG. 2.

[Overall Configuration]

A fuel cell stack 1 according to this embodiment is e.g. a polymer electrolyte fuel cell (PEFC) and generates electricity, heat, and water at the same time by electrochemically reacting fuel gas containing hydrogen with oxidizer gas containing oxygen such as air. As shown in FIG. 1, the fuel cell stack 1 comprises e.g. a fuel cell module (cell) 2 that is a single-cell module, a current collector plate 3, an end plate 4, and a spring 5. In the fuel cell stack 1, a plurality of fuel cell modules 2 are stacked so as to be connected in series. FIG. 1 shows the state where one of the fuel cell modules 2 is disassembled, with the remaining fuel cell modules 2 being stacked. The current collector plate 3, the end plate 4, and the spring 5 are attached to outermost layers at both ends of the fuel cell stack 1. The end plate 4 and the current collector plate 3 arranged inside the end plate 4 are attached to the both ends of the fuel cell stack 1, with a plurality of springs 5 being arranged on an inner surface i.e. a surface toward the fuel cell modules 2, of the end plate 4. The fuel cell stack 1 is fastened with fastening bolts 7 inserted through bolt holes 6 from the both ends and nuts 8.

The fuel cell module 2 comprises, as shown in FIGS. 1 to 3, a membrane-electrode assembly 10, an anode separator 11A, a cathode separator 11C, an anode sealing member 9A, and a cathode sealing member 9C. The membrane-electrode assembly 10 includes an anode catalyst layer 16 disposed on a first main surface 15a of a polymer electrolyte membrane 15, a cathode catalyst layer 17 disposed on a second main surface 15b of the polymer electrolyte membrane 15, an anode gas diffusion layer 18A laminated on the anode catalyst layer 16, and a cathode gas diffusion layer 18C laminated on the cathode catalyst layer 17. The anode separator 11A is arranged toward the anode gas diffusion layer 18A of the membrane-electrode assembly 10. The cathode separator 11C is arranged toward the cathode gas diffusion layer 18C of the membrane-electrode assembly 10 and sandwiches the membrane-electrode assembly 10 in pairs with the anode separator 11A. The anode sealing member 9A has an opening and joins the membrane-electrode assembly 10 and the anode separator 11A together. The cathode sealing member 9C has an opening and joins the membrane-electrode assembly 10 and the cathode separator 11C together. A cooling water separator 11W may be arranged outside the anode separator 11A and the cathode separator 11C.

In this embodiment, the membrane-electrode assembly may sometimes be referred to as MEA. The anode sealing member 9A and the cathode sealing member 9C may sometimes be referred to collectively as a sealing member 9.

The anode separator 11A, the cathode separator 11C, and the cooling water separator 11W may sometimes be referred to collectively as a separator 11. The anode gas diffusion layer 18A and the cathode gas diffusion layer 18C may sometimes be referred to collectively as a gas diffusion layer 18.

<Current Collector Plate>

The current collector plate 3 is arranged outside a stack of the fuel cell modules 2. To efficiently collect electricity generated by the fuel cell modules 2, the current collector plate 3 can be e.g. a copper plate plated with gold. The current collector plate 3 may be made of a metal material having good electrical conductivity such as iron, nickel, stainless steel, or aluminum. Surface treatment such as tin plating or nickel plating may be applied.

<End Plate>

The end plate 4 is arranged outside the current collector plate 3. The end plate 4 is formed of e.g. a material with electrical insulation and functions also as an insulating plate. The end plate 4 can be formed by e.g. injection molding using a polyphenylene sulfide resin. Pipes integrated with the end plate 4 are for example pressed, via gaskets not shown, against manifold holes 12 of the stack of the fuel cell modules 2. The springs 5 applying loads to the fuel cell modules 2 are arranged on the inner surface i.e. the surface toward the fuel cell modules 2, of the end plate 4. The springs 5 are concentratedly arranged on a portion that overlaps with the MEA 10 of the fuel cell module 2 when stacked. The fuel cell stack 1 is fastened with the fastening bolts 7 and the nuts 8 so that the urging force of the springs 5 becomes a predetermined value.

<Polymer Electrolyte Membrane>

The polymer electrolyte membrane 15 can be a solid polymer material exhibiting proton conductivity, e.g. a perfluorosulfonic acid membrane. Available as the perfluorosulfonic acid membrane is e.g. a Nafion membrane manufactured by DuPont.

<Membrane-Electrode Assembly>

In the MEA 10, the anode catalyst layer 16 made mainly of e.g. carbon powder carrying a platinum ruthenium alloy catalyst is formed on the anode-side surface i.e. the first main surface 15a, of the polymer electrolyte membrane 15 selectively transporting hydrogen ions. The cathode catalyst layer 17 made mainly of e.g. carbon powder carrying a platinum catalyst is formed on the cathode-side surface i.e. the second main surface 15b, of the polymer electrolyte membrane 15. The anode gas diffusion layer 18A is laminated on the anode catalyst layer 16, and the cathode gas diffusion layer 18C is laminated on the cathode catalyst layer 17.

<Gas Diffusion Layer>

The anode gas diffusion layer 18A is laminated on the anode catalyst layer 16 and has functions of ensuring breathability and electrical conductivity of fuel gas. The cathode gas diffusion layer 18C is laminated on the cathode catalyst layer 17 and has functions of ensuring breathability and electrical conductivity of oxidizer gas. For example, carbon paper or carbon cloth is used as the gas diffusion layer 18.

<Separator>

The anode separator 11A and the cathode separator 11C are formed in a flat plate shape. The anode separator 11A and the cathode separator 11C have a fuel gas flow path groove 13A and an oxidizer gas flow path groove 13C, respectively, formed, in accordance with the shape of the MEA 10, on their respective surfaces in contact with the MEA 10 i.e. on inner surfaces 11Ai and 11Ci shown in FIGS. 8 and 9 that will be described later. The inner surface 11Ai of the anode separator 11A is formed in contact with the gas diffusion layer 18A (FIG. 3) of the MEA 10. The inner surface 11Ci of the cathode separator 11C is formed in contact with the gas diffusion layer 18C (FIG. 3) of the MEA 10. A cooling water flow path groove 13W is formed on outer surfaces 11Ao and 11Co of the anode separator 11A and the cathode separator 11C shown in FIGS. 8 and 9 described later and on both surfaces of the cooling water separator 11W.

The separator 11 is made of a gas-impermeable conductive material. The separator 11 can be made of e.g. a resin-impregnated carbon material cut into a predetermined shape, a molded mixture of carbon powder and resin material, or a molded metal.

<Sealing Member>

FIG. 2 is a view of the MEA 10 and the sealing member 9, seen from a direction perpendicular to the first main surface 15a. Hereinafter, the direction perpendicular to the first main surface 15a may sometimes be referred to as a thickness direction. The state viewed from the direction perpendicular to the first main surface 15a may sometimes be referred to as plan view. As shown in FIG. 2, the sealing member 9 includes an opening portion 26. The opening portion 26 is a through-hole passing through a central portion of the sealing member 9 in the thickness direction i.e. in Z-axis direction of FIG. 2. For example, a fiber sheet enclosed in insulating resin is used for the sealing member 9. In view of insulation, heat resistance, gas permeability, etc., the fiber sheet enclosed in resin is preferably e.g. a prepreg containing glass fiber impregnated with epoxy resin. For example, an inorganic fiber such as a ceramic fiber can be used as the fiber, depending on strength, thickness, linear expansion coefficient, contained substances, etc. The resin may be other thermosetting resin such as phenol resin, unsaturated polyester resin, or polyurethane resin or may be of a configuration in which resin containing fibers and other resin are laminated in multiple layers or of a configuration having a partially different composition. Although this embodiment uses the fiber sheet enclosed in insulating resin, an adhesive sheet may be used that has adhesive layers formed on both sides of a base material such as polyethylene naphthalate film.

As shown in FIGS. 1 and 2, the manifold holes 12 and the bolt holes 6 are disposed in a peripheral edge portion of the separator 11 and the sealing member 9 and each pass therethrough in the thickness direction. The manifold holes 12 are through-holes through which fuel gas, oxidizer gas, and cooling water each flow. With the plurality of fuel cell modules 2 stacked, the manifold holes 12 of each fuel cell module 2 are stacked and coupled together to form a fuel gas manifold, an oxidizer gas manifold, and a cooling water manifold.

The anode sealing member 9A is arranged so as to overlap the anode gas diffusion layer 18A in the thickness direction. In this embodiment, the anode sealing member 9A is arranged overlapping the anode gas diffusion layer 18A in the thickness direction in a region including an edge 26a of the opening portion 26. At this time, a portion of the anode sealing member 9A overlapping the anode gas diffusion layer 18A is referred to as a region F1. Similarly, the cathode sealing member 9C is also arranged so as to overlap the cathode gas diffusion layer 18C in the region including the edge 26a of the opening portion 26. In this embodiment, the region F1 in plan view is a region from the edge 26a of the opening portion 26 of the sealing member 9 to a position apart a predetermined length outside in a plane direction and represents the region where the sealing member 9 overlaps the gas diffusion layer 18. The sealing member 9 is arranged so as to cover an outer peripheral portion of the gas diffusion layer 18.

Figure 4:
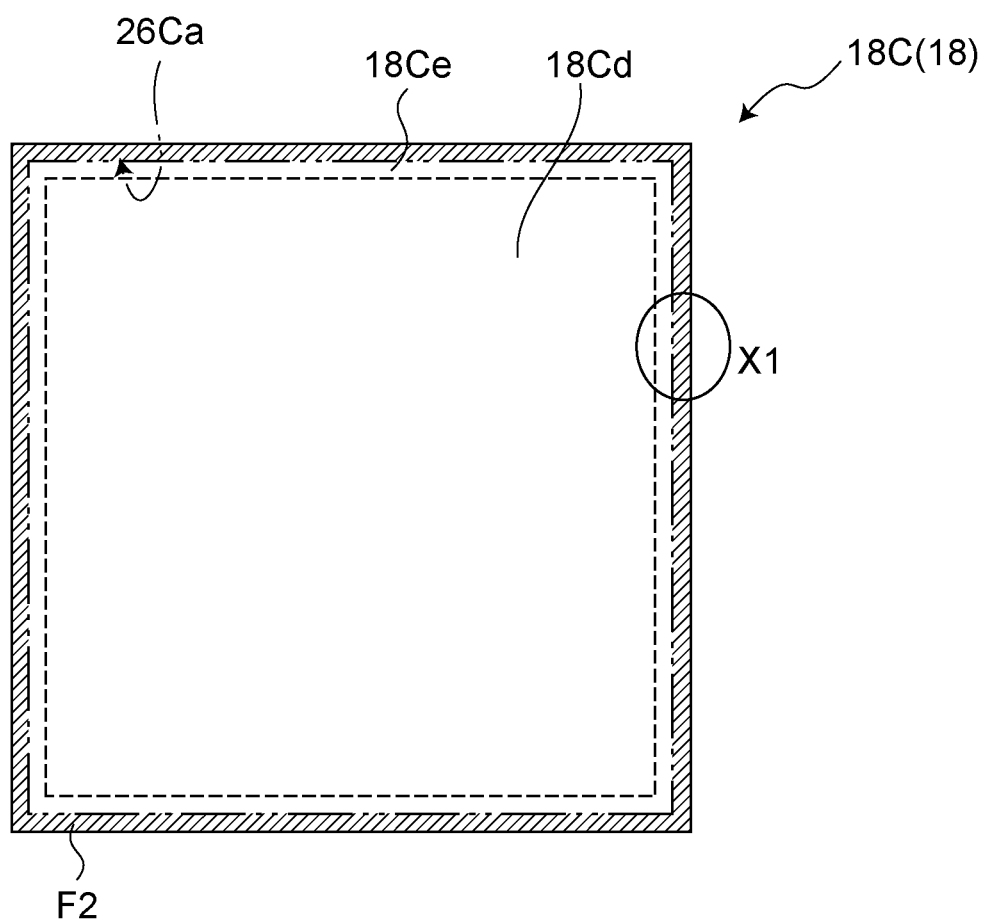
FIG. 4 is a plan view of a cathode gas diffusion layer of the fuel cell module according to the first embodiment of the present disclosure.
Figure 5:
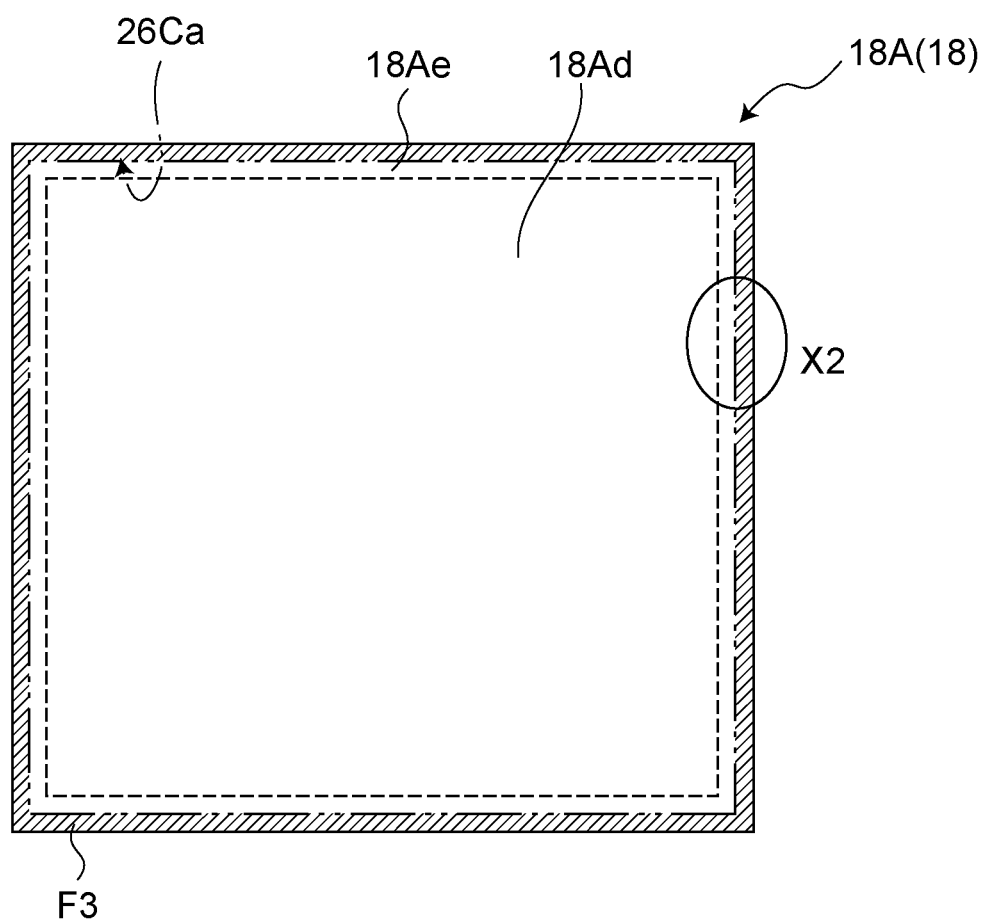
FIG. 5 is a plan view of an anode gas diffusion layer of the fuel cell module according to the first embodiment of the present disclosure.
Figure 6:
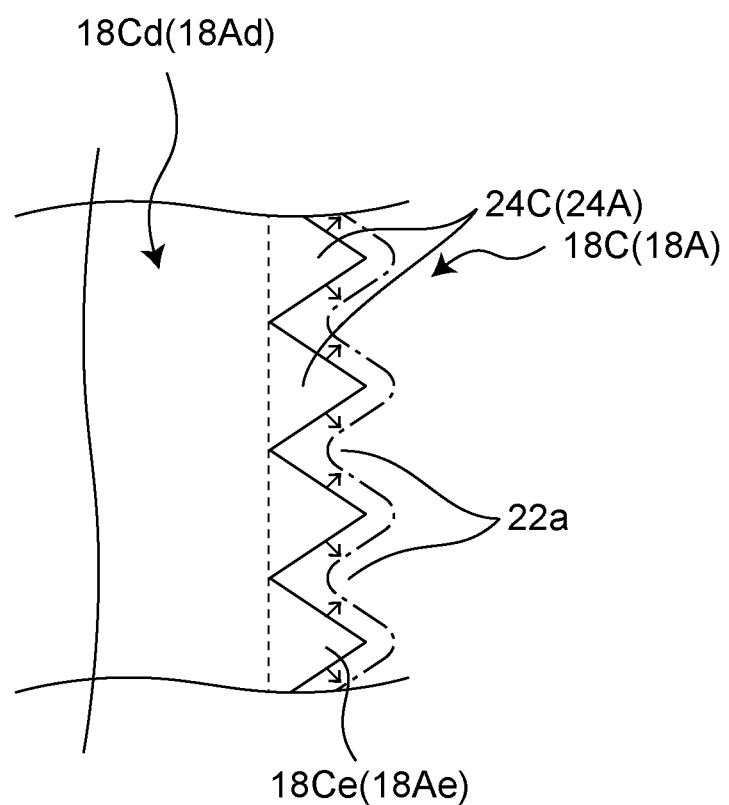
FIG. 6 is an enlarged view of a part of an outer peripheral portion processed in a saw teeth shape of the gas diffusion layer of FIGS. 4 and 5.
Figure 7:
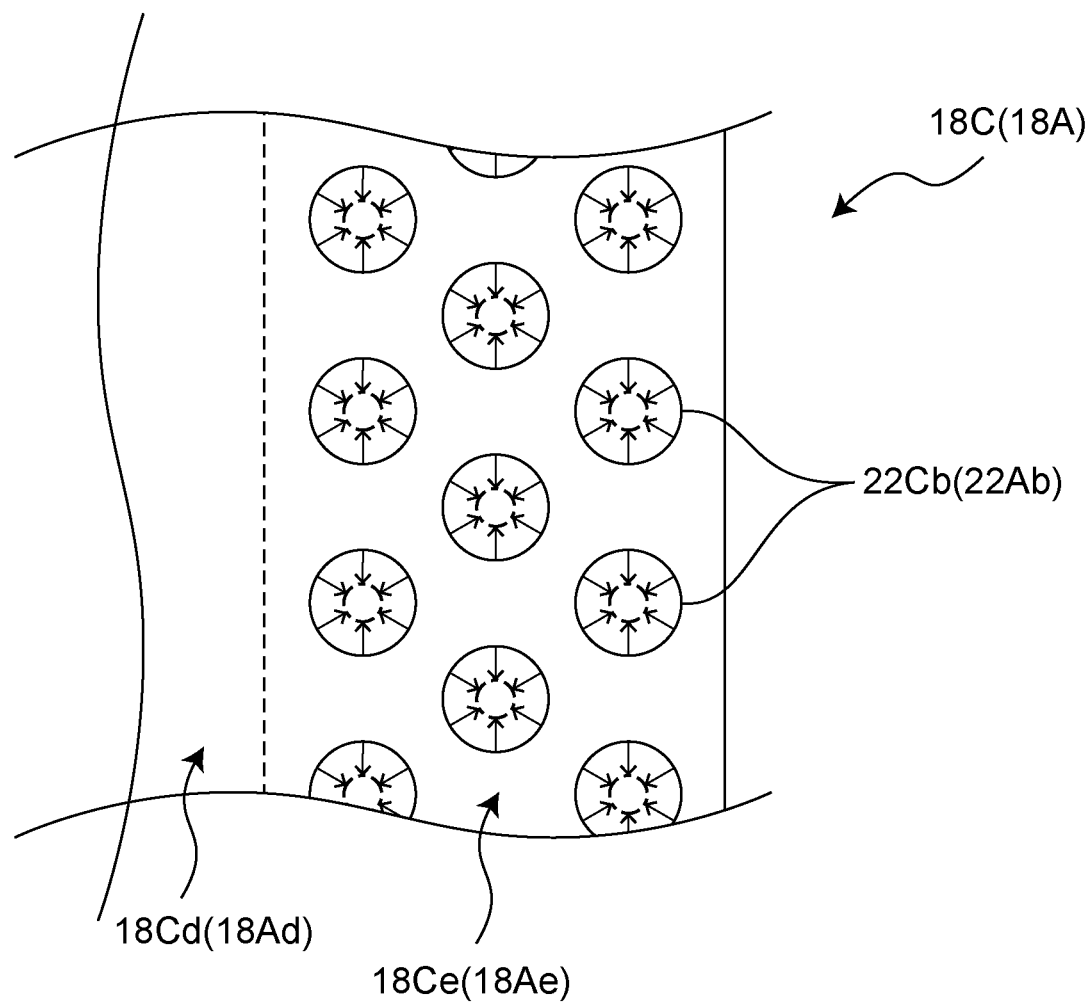
FIG. 7 is an enlarged view of a part of the outer peripheral portion formed with through-holes of the gas diffusion layer of FIGS. 4 and 5.

The gas diffusion layer 18 shown in FIG. 3 will be described in detail with reference to FIGS. 4 to 7. FIG. 4 is a plan view of the cathode gas diffusion layer 18C. FIG. 5 is a plan view of the anode gas diffusion layer 18A. FIG. 6 shows a processing example of outer peripheral portions of the anode gas diffusion layer 18A and the cathode gas diffusion layer 18C and is an enlarged view of X1 of FIG. 4 and X2 of FIG. 5. FIG. 7 shows another processing example of the outer peripheral portions of the anode gas diffusion layer 18A and the cathode gas diffusion layer 18C and is an enlarged view of X1 of FIG. 4 and X2 of FIG. 5. For the sake of explanation, some emphasized portions are included in FIGS. 4 to 7.

The cathode gas diffusion layer 18C has a cathode-side inner region F2 overlapping the cathode sealing member 9C in a region including an edge 26Ca of an opening portion 26C of the cathode sealing member 9C, when viewed from the direction perpendicular to the first main surface 15a. The cathode-side inner region F2 is a portion corresponding to the region F1 of FIG. 2, i.e. a portion where the cathode sealing member 9C and the cathode gas diffusion layer 18C overlap. As shown in FIG. 4, the cathode gas diffusion layer 18C has a first cathode gas diffusion layer 18Ce that is an outer peripheral portion of the cathode gas diffusion layer 18C including the cathode-side inner region F2 and a second cathode gas diffusion layer 18Cd that is a portion inside the first cathode gas diffusion layer 18Ce. That is, the first cathode gas diffusion layer 18Ce is a portion lying at an outermost layer in the plane direction of the cathode gas diffusion layer 18C. The cathode gas diffusion layer 18C has the cathode-side inner region F2 that is a portion overlapping in the thickness direction with the cathode sealing member 9C in at least a part of the outer peripheral portion. In this embodiment, the first cathode gas diffusion layer 18Ce is the portion including the cathode-side inner region F2. In other words, the cathode sealing member 9C overlaps in the thickness direction with a part of the first cathode gas diffusion layer 18Ce.

The anode gas diffusion layer 18A has an anode-side inner region F3 overlapping the anode sealing member 9A in a region including an edge 26Aa of an opening portion 26Aof the anode sealing member 9A, when viewed from the direction perpendicular to the first main surface 15a. The anode-side inner region F3 is a portion corresponding to the region F1 of FIG. 2, i.e. a portion where the anode sealing member 9A and the anode gas diffusion layer 18A overlap. As shown in FIG. 5, the anode gas diffusion layer 18A has a first anode gas diffusion layer 18Ae that is an outer peripheral portion of the anode gas diffusion layer 18A including the anode-side inner region F3 and a second anode gas diffusion layer 18Ad that is a portion inside the first anode gas diffusion layer 18Ae. That is, the first anode gas diffusion layer 18Ae is a portion lying at the outer peripheral portion of the anode gas diffusion layer 18A. The anode gas diffusion layer 18A has the anode-side inner region F3 that is a portion overlapping in the thickness direction with the anode sealing member 9A in at least a part of the outer peripheral portion. In this embodiment, the first anode gas diffusion layer 18Ae is the portion including the anode-side inner region F3. In other words, the anode sealing member 9A overlaps in the thickness direction with a part of the first anode gas diffusion layer 18Ae.

The cathode gas diffusion layer 18C has, in at least a part including the cathode-side inner region F2, a void passing through the cathode gas diffusion layer 18C in the thickness direction. Similarly, the anode gas diffusion layer 18A includes, in at least a part including the anode-side inner region F3, a void passing through the anode gas diffusion layer 18A in the thickness direction. As shown in FIG. 6, the void formed in the anode gas diffusion layer 18A and the cathode gas diffusion layer 18C is e.g. a void 22a defined by serrated portions 24A and 24C formed in a saw teeth shape in plan view. The serrated portions 24A and 24C are portions each formed with a plurality of notches and a plurality of projections along an end of the gas diffusion layer 18. The serrated portions 24A and 24C are disposed in the first anode gas diffusion layer 18Ae of the anode gas diffusion layer 18A or in the first cathode gas diffusion layer 18Ce of the cathode gas diffusion layer 18C. In this embodiment, the void 22a is formed between the serrated portions 24A and 24C in the first anode gas diffusion layer 18Ae and the first cathode gas diffusion layer 18Ce. The serrated portions 24A and 24C may be disposed over the entire outer peripheral portions of the first anode gas diffusion layer 18Ae and the first cathode gas diffusion layer 18Ce.

As shown in FIG. 7, the void formed in the gas diffusion layer 18 may be a plurality of through-holes 22Ab and 22Cb disposed in the first anode gas diffusion layer 18Ae and the first cathode gas diffusion layer 18Ce. The through-holes 22Ab and 22Cb are holes passing through the first anode gas diffusion layer 18Ae and the first cathode gas diffusion layer 18Ce in the thickness direction. The through-holes 22Ab and 22Cb may be formed in e.g. a circular shape in plan view.

For example, as shown in FIG. 7, the through-holes 22Ab may be aligned and arranged so that they are evenly distributed in the first anode gas diffusion layer 18Ae. For example, the size of the through-holes 22Ab may be formed larger than the thickness of the first anode gas diffusion layer 18Ae. Similarly, the through-holes 22Cb may also be aligned and arranged so that they are evenly distributed in the first cathode gas diffusion layer 18Ce, as shown in FIG. 7. For example, the size of the through-holes 22Cb may be formed larger than the thickness of the first cathode gas diffusion layer 18Ce.

The second anode gas diffusion layer 18Ad and the second cathode gas diffusion layer 18Cd are portions adjacent inside the first anode gas diffusion layer 18Ae and the first cathode gas diffusion layer 18Ce in the plane direction.

In this embodiment, the gas diffusion layer 18 is made using a roll-to-roll system and the void is formed by including a step of punching the gas diffusion layer 18 continuously formed into a sheet with the same composition to a predetermined size. For this reason, the first anode gas diffusion layer 18Ae and the first cathode gas diffusion layer 18Ce, and the second anode gas diffusion layer 18Ad and the second cathode gas diffusion layer 18Cd are formed with the same composition. As a processing method for the void portion, a method can also be employed for example in which at the time of producing the gas diffusion layer 18, the composition is changed between when producing the first anode gas diffusion layer 18Ae and the first cathode gas diffusion layer 18Ce and when producing the second anode gas diffusion layer 18Ad and the second cathode gas diffusion layer 18Cd.

Figure 8:
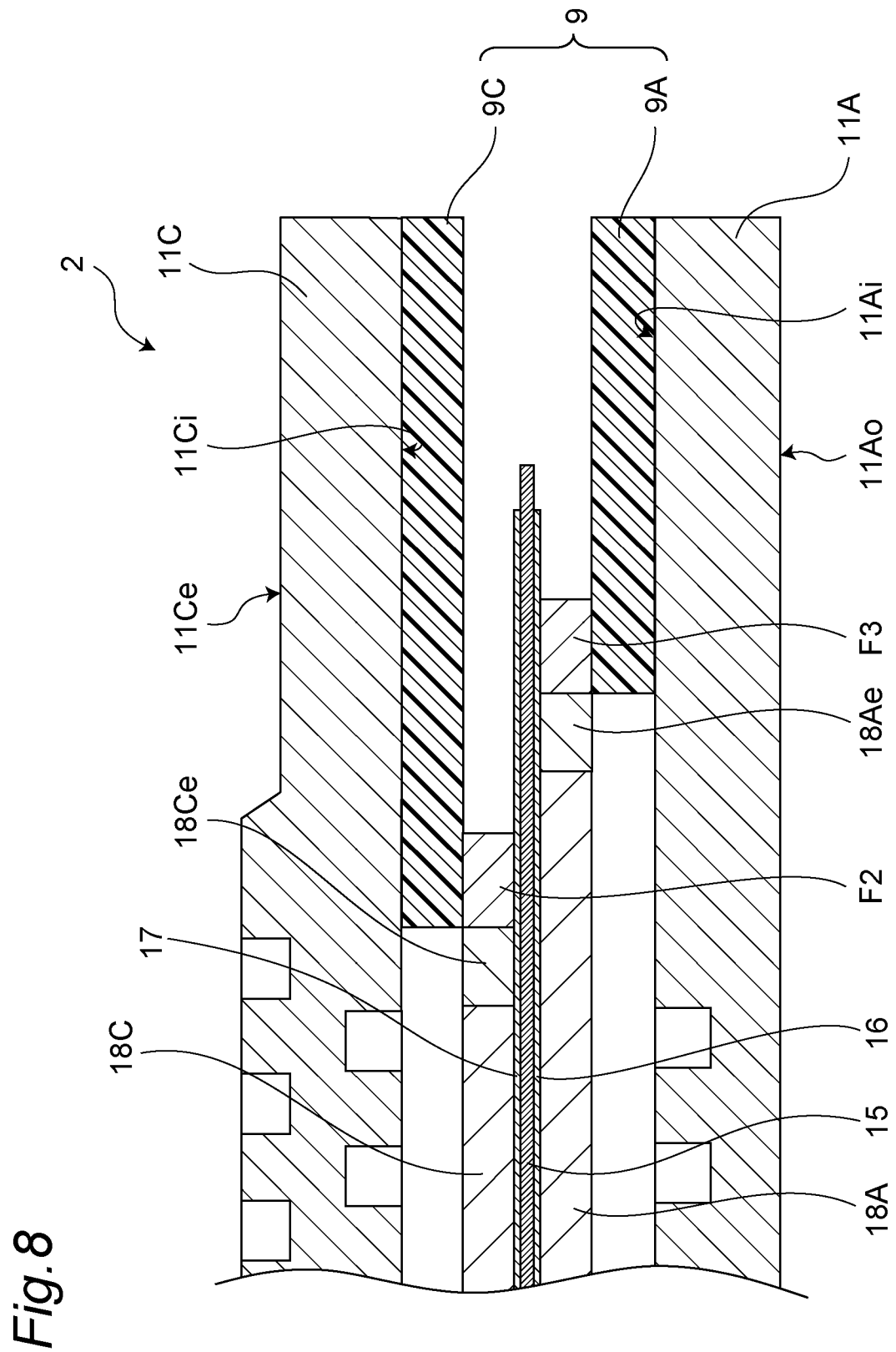
FIG. 8 is a sectional view showing a positional relationship of constituent members of the fuel cell module according to the first embodiment of the present disclosure.

To prevent the polymer electrolyte membrane 15, the anode catalyst layer 16, and the cathode catalyst layer 17 from being exposed on both the anode and cathode surfaces of the MEA 10, the sealing member 9 and the gas diffusion layer 18 are arranged as shown in FIG. 8. Specifically, the sealing member 9 is arranged such that the cathode sealing member 9C and the cathode-side inner region F2 of the cathode gas diffusion layer 18C overlap in the thickness direction and such that the anode sealing member 9A and the anode-side inner region F3 of the anode gas diffusion layer 18A overlap in the thickness direction. Furthermore, the sealing member 9 is arranged such that the cathode-side inner region F2 and the anode-side inner region F3 do not overlap in the thickness direction.

Figure 9:
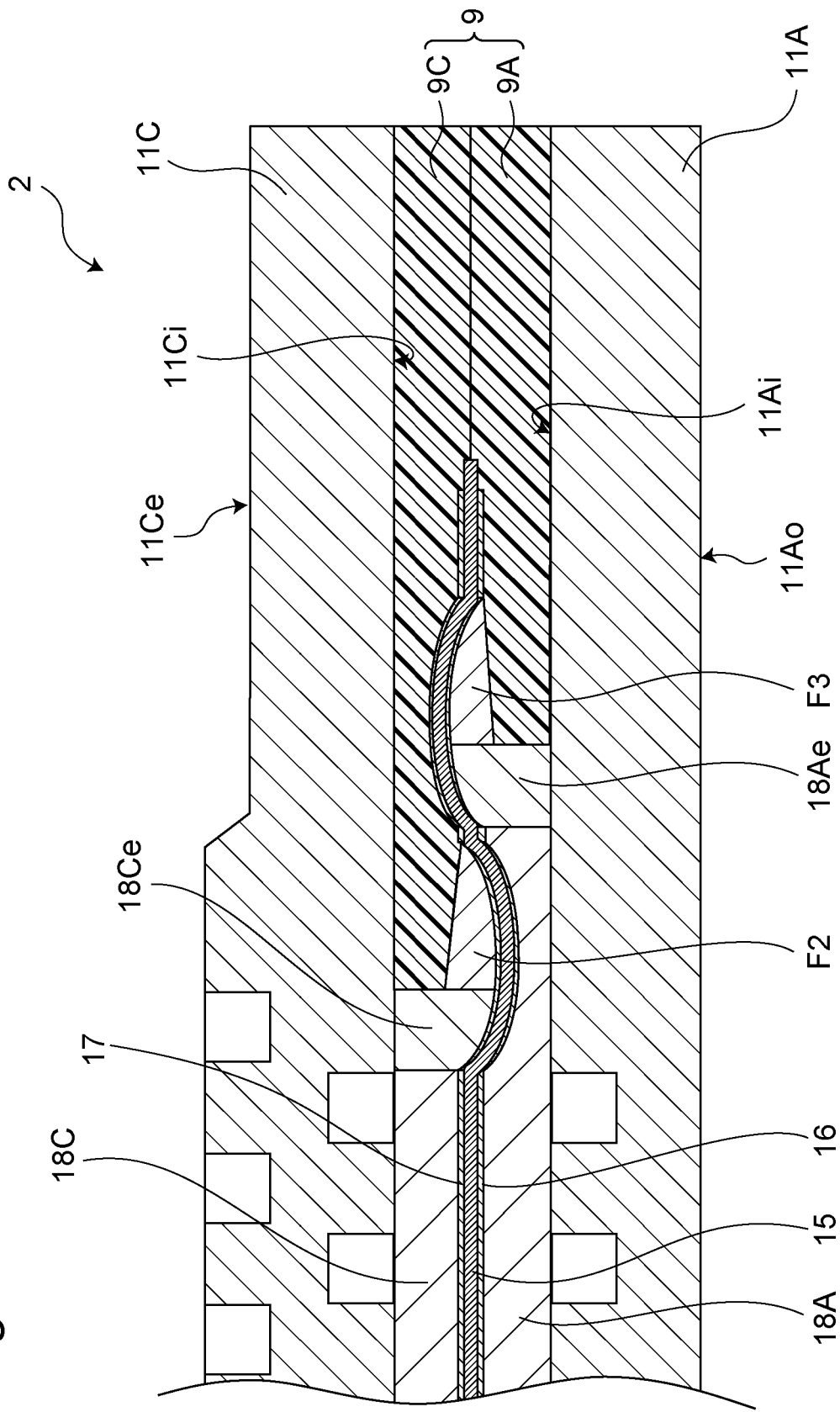
FIG. 9 is a partial sectional view of the fuel cell module according to the first embodiment of the present disclosure.

As shown in FIG. 8, after arrangement of the sealing member 9 on the MEA 10, the MEA 10 and the sealing member 9 are clamped by the cathode separator 11C and the anode separator 11A. At this time, when a load is applied in the thickness direction by clamping by the separator 11 as shown in FIG. 9, stress concentrates on the cathode-side inner region F2 and anode-side inner region F3 that are overlapping portions between the gas diffusion layer 18 and the sealing member 9. In this embodiment, due to formation of the void, the first anode gas diffusion layer 18Ae and the first cathode gas diffusion layer 18Ce are compressed in the thickness direction while being deformed in the plane direction toward the void 22a or the through-holes 22Ab and 22Cb. That is, the first anode gas diffusion layer 18Ae and the first cathode gas diffusion layer 18Ce deform in the directions indicated by arrows of FIG. 6 or 7. Specifically, when receiving a load in the thickness direction, the first anode gas diffusion layer 18Ae and the first cathode gas diffusion layer 18Ce including the serrated portions 24A and 24C of FIG. 6 deform from a shape indicated by the solid line into a shape indicated by the one-dot chain line so that the void 22a becomes smaller. Similarly, in the first anode gas diffusion layer 18Ae and the first cathode gas diffusion layer 18Ce of FIG. 7, the through-holes 22Cb deform from a shape indicated by the solid line into a shape indicated by the one-dot chain line so that the size of the through-holes 22Ab and 22Cb becomes smaller. Due to deformation in the plane direction of the first anode gas diffusion layer 18Ae and the first cathode gas diffusion layer 18Ce, a force becomes hard to act in the thickness direction on the first anode gas diffusion layer 18Ae and the first cathode gas diffusion layer 18Ce. It is therefore possible to relieve stress concentration on the anode-side inner region F3 and the cathode-side inner region F2 that are portions where the sealing member 9 and the gas diffusion layer 18 overlap. Breakage of the separator 11 can thus be prevented.

Furthermore, as shown in FIG. 8, by preventing the anode-side inner region F3 and the cathode-side inner region F2 from overlapping in plan view, stress concentration can be relieved. For example, by making the external dimensions of the anode gas diffusion layer 18A larger than the external dimensions of the cathode gas diffusion layer 18C, the anode-side inner region F3 and the cathode-side inner region F2 can be prevented from overlapping.

The widths of the first anode gas diffusion layer 18Ae and the first cathode gas diffusion layer 18Ce of the gas diffusion layer 18 are preferably determined in view of the misalignment accuracy at the time when arranging the gas diffusion layer 18 and the sealing member 9 in an overlapped manner. Specifically, to prevent breakage of the separator even if the misalignment accuracy deteriorates to cause an increase in the amount of misalignment, it is preferred that decision be made so that the gas diffusion layer and the sealing member 9 do not overlap in portions other than the first anode gas diffusion layer 18Ae and the first cathode gas diffusion layer 18Ce. The widths of the first anode gas diffusion layer 18Ae and the first cathode gas diffusion layer 18Ce are preferably determined so that there is no gap between the gas diffusion layer and the sealing member 9 in order to prevent deterioration, rupture, etc. of the polymer electrolyte membrane 15.

For example, if the arrangement accuracy of the sealing member with respect to the gas diffusion layer 18 is ±0.5 mm, design is made so that the overlapping region remains even when the overlapping dimension is reduced by 1 mm in the case of maximum overlapping. For example, in the case of minimum overlapping of 0.2 mm, breakage of the separator can be prevented by setting the widths of the first anode gas diffusion layer 18Ae and the first cathode gas diffusion layer 18Ce to 1.2 mm or more.

Figure 10:
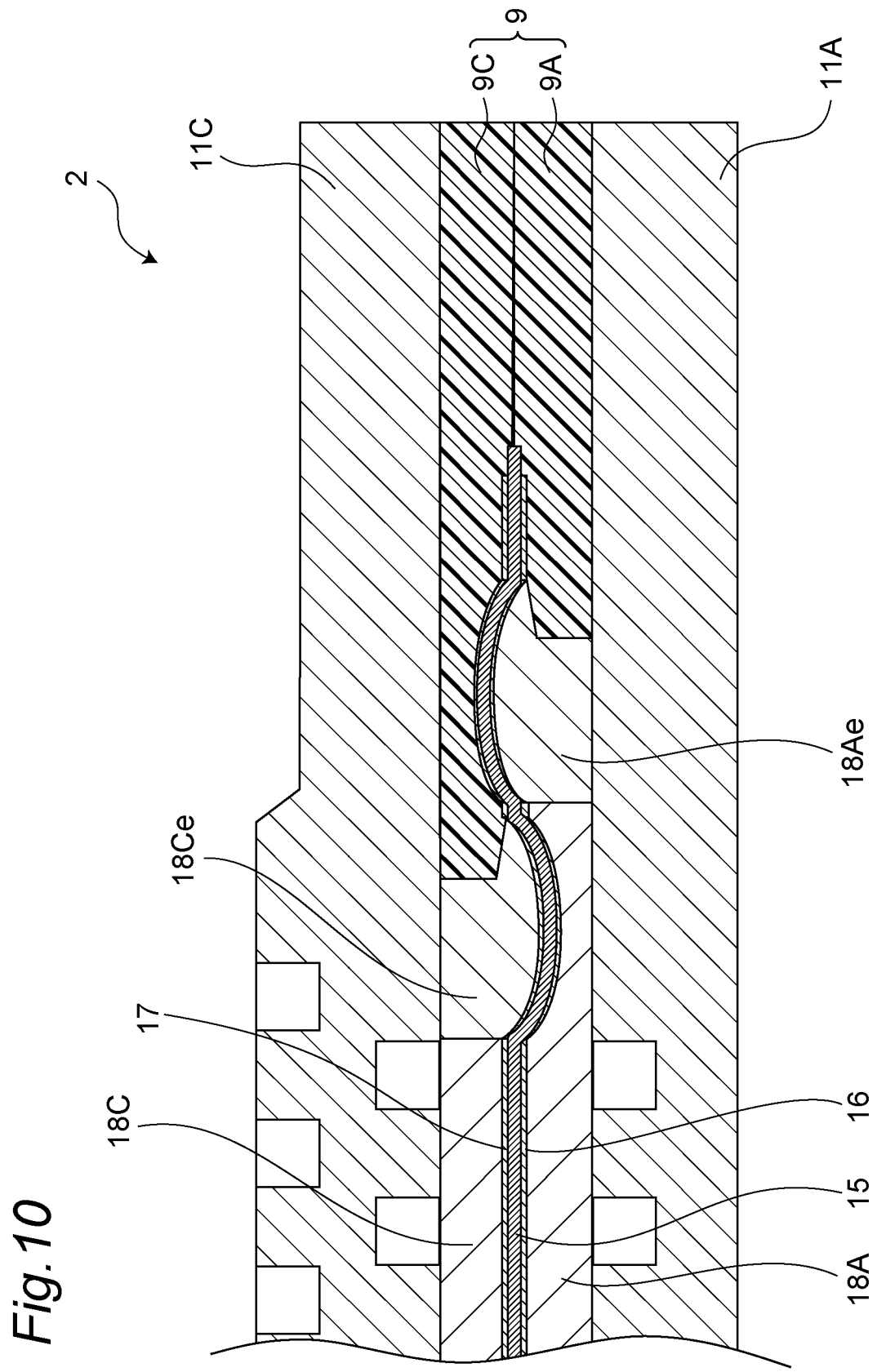
FIG. 10 is a partial sectional view of the fuel cell module according to the first embodiment of the present disclosure.

As shown in FIG. 10, the areas of the anode-side inner region F3 and the cathode-side inner region F2 may be smaller than those in the case shown in FIG. 9. Due to the smaller areas of the anode-side inner region F3 and the cathode-side inner region F2 that are overlapping portions between the sealing member 9 and the gas diffusion layer 18 as compared with the case of FIG. 9, the deformed portion of the gas diffusion layer 18 becomes smaller in FIG. 10. That is, in FIG. 10, the deformed portions of the first anode gas diffusion layer 18Ae and the first cathode gas diffusion layer 18Ce become smaller as compared with the case of FIG. 9. Also in the case where the anode-side inner region F3 and the cathode-side inner region F2 are small in size as in FIG. 10, gaps between the gas diffusion layer 18 and the sealing member 9 can be eliminated, similar to the case of FIG. 9.

[Manufacturing Method]

Figure 11:
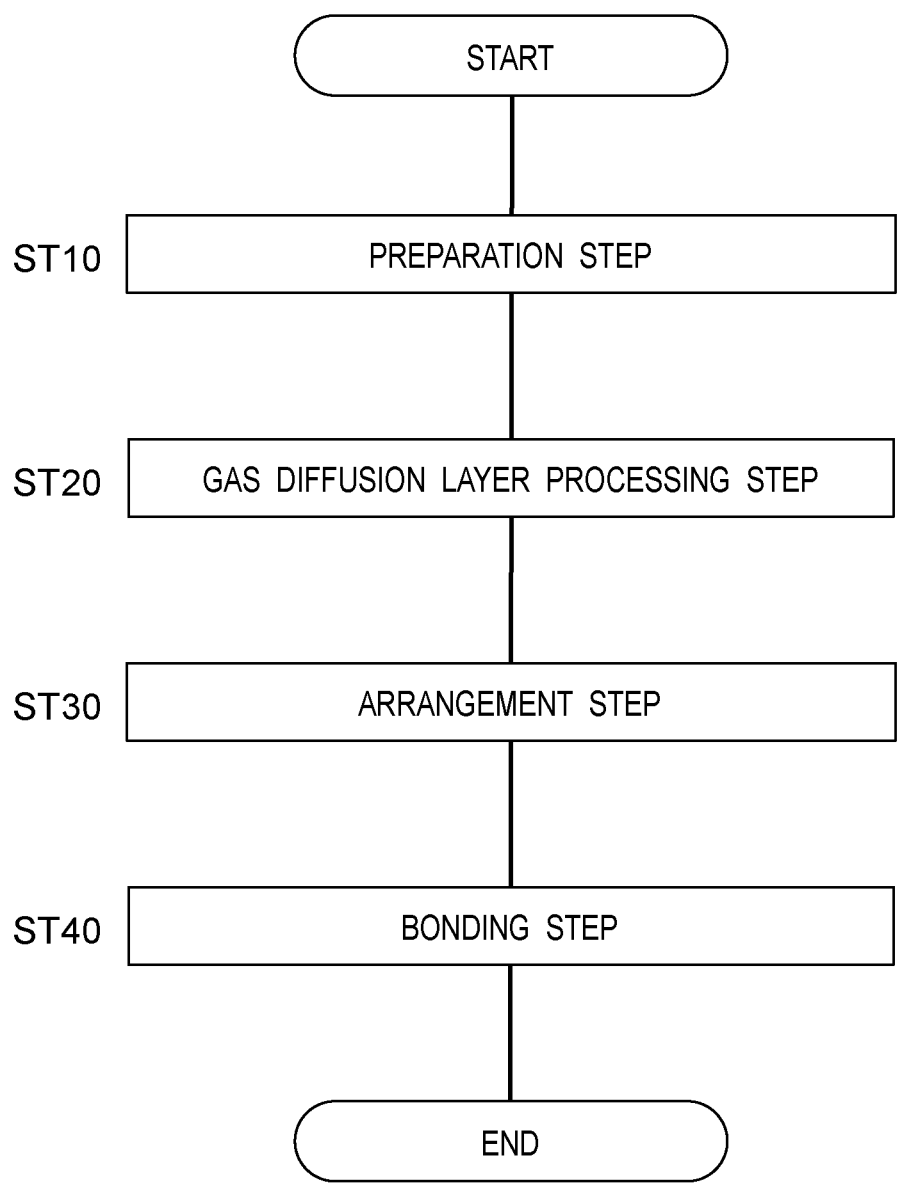
FIG. 11 is an exemplary flowchart of a manufacturing method of the fuel cell module according to the first embodiment of the present disclosure.

Referring next to FIG. 11, a manufacturing method of the fuel cell module 2 will be described. FIG. 11 shows an exemplary flowchart of the manufacturing method of the fuel cell module 2. As shown in FIG. 11, the manufacturing method of the fuel cell module 2 includes a preparation step ST10, a gas diffusion layer processing step ST20, an arrangement step ST30, and a bonding step ST40.

The preparation step ST10 includes preparing the polymer electrolyte membrane 15 having the first main surface 15a disposed with the anode catalyst layer 16 and the second main surface 15b disposed with the cathode catalyst layer 17, and the anode gas diffusion layer 18A and the cathode gas diffusion layer 18C. It further includes preparing the anode separator 11A and the cathode separator 11C, and the anode sealing member 9A and the cathode sealing member 9C.

At the gas diffusion layer processing step ST20, a void is formed in at least a part of the outer peripheral portions of the anode gas diffusion layer 18A and the cathode gas diffusion layer 18C. For example, by punching, the void is formed in at least a part of the respective outer peripheral portions of the anode gas diffusion layer 18A and the cathode gas diffusion layer 18C. The void may be the serrated portions 24A and 24C shown in FIG. 6. Alternatively, it may be the through-holes shown in FIG. 7.

At the arrangement step ST30, the anode gas diffusion layer 18A is laminated on the side of the anode catalyst layer 16 of the polymer electrolyte membrane 15, while the cathode gas diffusion layer 18C is laminated on the side of the cathode catalyst layer 17 thereof, to form the membrane-electrode assembly 10. The anode sealing member is arranged so as to overlap at least a part of the outer peripheral portion of the anode gas diffusion layer 18A, and the cathode sealing member 9C is arranged overlapping at least a part of the outer peripheral portion of the cathode gas diffusion layer 18C.

At the bonding step ST40, the anode gas diffusion layer 18A of the membrane-electrode assembly 10 and the anode separator 11A are bonded together via the anode sealing member 9A, and the cathode gas diffusion layer 18C of the membrane-electrode assembly 10 and the cathode separator 11C are bonded together. In this manner, by bonding the gas diffusion layer 18 and the separator 11 together by the sealing member 9, the membrane-electrode assembly 10 is sandwiched by the anode separator 11A and the cathode separator 11C. By sandwiching the MEA 10 by the anode separator 11A and the cathode separator 11C and heating them, the MEA 10 and the separator 11 can be bonded together.

As described above, through the preparation step ST10, the gas diffusion layer processing step ST20, the arrangement step ST30, and the bonding step ST40, the fuel cell module 2 according to this embodiment is manufactured. The thus manufactured fuel cell modules 2 are stacked and fastened together to thereby complete the fuel cell stack 1.

[Effects]

The fuel cell module 2 according to the first embodiment comprises the membrane-electrode assembly 10, the separator 11, and the sealing member 9. The membrane-electrode assembly 10 includes the polymer electrolyte membrane 15, the anode catalyst layer 16, the cathode catalyst layer 17, the anode gas diffusion layer 18A laminated on the anode catalyst layer 16, and the cathode gas diffusion layer 18C laminated on the cathode catalyst layer 17. The anode catalyst layer 16 is disposed on the first main surface 15a of the polymer electrolyte membrane 15. The cathode catalyst layer 17 is disposed on the second main surface 15b of the polymer electrolyte membrane 15. The anode separator 11A and the cathode separator 11C as a pair of separators 11 sandwich the membrane-electrode assembly 10 therebetween. The sealing member 9 bonds the membrane-electrode assembly 10 and the anode separator 11A and the cathode separator 11C, respectively. In plan view, the sealing member 9 has the opening portion 26. The anode gas diffusion layer 18A and the anode sealing member 9A overlap in the anode-side inner region F3 including the edge 26a of the opening portion 26 of the anode sealing member 9A. The cathode gas diffusion layer 18C and the cathode sealing member 9C overlap in the cathode-side inner region F2 including the edge 26a of the opening portion 26 of the cathode sealing member 9C. The anode gas diffusion layer 18A includes a void passing through in the thickness direction formed in at least a part including the anode-side inner region F3, while the cathode gas diffusion layer 18C includes a void passing through in the thickness direction formed in at least a part including the cathode-side inner region F2.

According to this configuration, due to the first anode gas diffusion layer 18Ae having a void passing through in the thickness direction in at least a part including the anode-side inner region F3, the void 22a or the through-holes 22Ab can be formed for allowing the first anode gas diffusion layer 18Ae to deform in the plane direction. Similarly, due to the first cathode gas diffusion layer 18Ce having a void passing through in the thickness direction in at least a part including the cathode-side inner region F2, the void 22a or the through-holes 22Cb can be formed for allowing the first cathode gas diffusion layer 18Ce to deform in the plane direction. This allows the first anode gas diffusion layer 18Ae and the first cathode gas diffusion layer 18Ce to deform toward the void 22a or the through-holes 22Ab and 22Cb when a load acts in the thickness direction on the first anode gas diffusion layer 18Ae and the first cathode gas diffusion layer 18Ce. Accordingly, even if a load is applied to the gas diffusion layer 18 and the sealing member 9 overlapping in the thickness direction, there can be prevented stress concentration on the anode-side inner region F3 and the cathode-side inner region F2 that are overlapping regions. As a result, even in the case of having the anode-side inner region F3 and the cathode-side inner region F2 where the outer peripheral portion of the gas diffusion layer 18 and the sealing member 9 overlap, stress concentration on the anode-side inner region F3 and the cathode-side inner region F2 can be prevented to suppress deterioration of the polymer electrolyte membrane 15. Due to having the regions where the gas diffusion layer 18 and the sealing member 9 overlap, exposure of the anode catalyst layer 16 and the cathode catalyst layer 17 can be prevented.

The plurality of through-holes 22Ab and 22Cb passing through in the thickness direction are disposed in the first anode gas diffusion layer 18Ae and the first cathode gas diffusion layer 18Ce.

According to this configuration, when the first anode gas diffusion layer 18Ae and the first cathode gas diffusion layer 18Ce are subjected to a load in the thickness direction, the first anode gas diffusion layer 18Ae and the first cathode gas diffusion layer 18Ce can deform in directions reducing the hole diameter of the through-holes 22Ab and 22Cb so that stress can be dispersed.

The serrated portions 24A and 24C formed in a saw teeth shape in plan view are disposed in the first anode gas diffusion layer 18Ae and the first cathode gas diffusion layer 18Ce.

According to this configuration, when the first anode gas diffusion layer 18Ae and the first cathode gas diffusion layer 18Ce are subjected to a load in the thickness direction, the first anode gas diffusion layer 18Ae and the first cathode gas diffusion layer 18Ce can deform toward the void 22a defined along the serrated portions 24A and 24C so that stress can be dispersed.

In the fuel cell stack 1 according to the first embodiment, the plurality of fuel cell modules 2 are connected in series and stacked together.

According to this configuration, stress concentration on the constituent members of the fuel cell stack 1 can be prevented.

The manufacturing method of the fuel cell module 2 according to the first embodiment includes the preparation step ST10, the gas diffusion layer processing step ST20, the arrangement step ST30, and the bonding step ST40. At the preparation step ST10, the polymer electrolyte membrane 15 disposed with the anode catalyst layer 16 and the cathode catalyst layer 17, the gas diffusion layer 18, the sealing member 9, and the separator 11 are prepared. At the gas diffusion layer processing step ST20, the void is formed in at least a part of the first anode gas diffusion layer 18Ae and the first cathode gas diffusion layer 18Ce. At the arrangement step ST30, the sealing member 9 is arranged on the MEA 10 so that the outer peripheral portion of the gas diffusion layer 18 overlaps at least partly with the sealing member 9. At the bonding step ST40, the MEA 10 and the sealing member 9 are sandwiched by the separator 11, and then the MEA 10 and the separator 11 are bonded together by the sealing member 9.

According to this manufacturing method, even if the outer peripheral portion of the gas diffusion layer 18 and the sealing member 9 overlap, stress concentration on the constituent members of the fuel cell module 2 can be prevented to suppress deterioration of the polymer electrolyte membrane 15.

The present disclosure is not limited to the first embodiment but can be carried out in various other modes. Although in the above embodiment the configuration has been exemplified and described where the cathode-side inner region F2 and the anode-side inner region F3 do not overlap in the thickness direction by making the external dimensions of the anode gas diffusion layer 18A larger than those of the cathode gas diffusion layer 18C, the configuration of the fuel cell module 2 is not limited thereto. For example, the fuel cell module 2 may have a configuration where the cathode gas diffusion layer 18C is larger in outer dimensions than the anode gas diffusion layer 18A. This configuration can also prevent stress concentration on the constituent members of the fuel cell module 2 and suppress deterioration of the polymer electrolyte membrane 15 in the case where the outer peripheral portion of the gas diffusion layer 18 and the sealing member 9 have an overlapping portion.

Although the void has been formed in the first anode gas diffusion layer 18Ae and the first cathode gas diffusion layer 18Ce by punching, the processing method is not limited thereto as long as the void is formed in at least a part of the outer peripheral portion of the gas diffusion layer 18.

Although the first cathode gas diffusion layer 18Ce and the first anode gas diffusion layer 18Ae are formed with the serrated portions 24C and 24A that are saw teeth-like voids in plan view, the shape of the void is not limited thereto. For example, the void may be formed so as to curve in the plane direction along the outer peripheral portions of the first cathode gas diffusion layer 18Ce and the first anode gas diffusion layer 18Ae. In this case also, even if a load is applied to the gas diffusion layer 18 and the sealing member 9 overlapping in the thickness direction, stress concentration on the constituent members of the fuel cell module 2 can be prevented.

Although the through-holes 22Ab and 22Cb are formed in a circular shape in plan view, the shape of the through-holes 22Ab and the 22Cb is not limited thereto. For example, the through-holes 22Ab and 22Cb may be of another shape such as an ellipse or a polygon in plan view.

Although the first anode gas diffusion layer 18Ae and the anode sealing member 9A, and the first cathode gas diffusion layer 18Ce and the cathode sealing member 9C overlap partly, this is not limitative. For example, in plan view, the anode sealing member 9A and the cathode sealing member 9C may overlap in the thickness direction with the entire first anode gas diffusion layer 18Ae and the entire cathode gas diffusion layer 18Ce. That is, in plan view, the anode-side inner region F3 and the first anode gas diffusion layer 18Ae may coincide and the cathode-side inner region F2 and the first cathode gas diffusion layer 18Ce may coincide.

Second Embodiment

A fuel cell module according to a second embodiment of the present disclosure will be described. In the second embodiment, differences from the first embodiment will mainly be described. In the second embodiment, the same or equivalent configurations as in the first embodiment will be described with the same reference numerals. In the second embodiment, descriptions overlapping with those in the first embodiment will be omitted.

In the first embodiment, the configuration has been described where the cathode-side inner region F2 and the anode-side inner region F3 are arranged so as not to overlap with each other by imparting different external dimensions to the cathode gas diffusion layer 18C and the anode gas diffusion layer 18A. The second embodiment has a configuration preventing the anode-side inner region F3 and the cathode-side inner region F2 from overlapping by imparting different shapes to the anode gas diffusion layer 18A and the cathode gas diffusion layer 18C.

Figure 12:
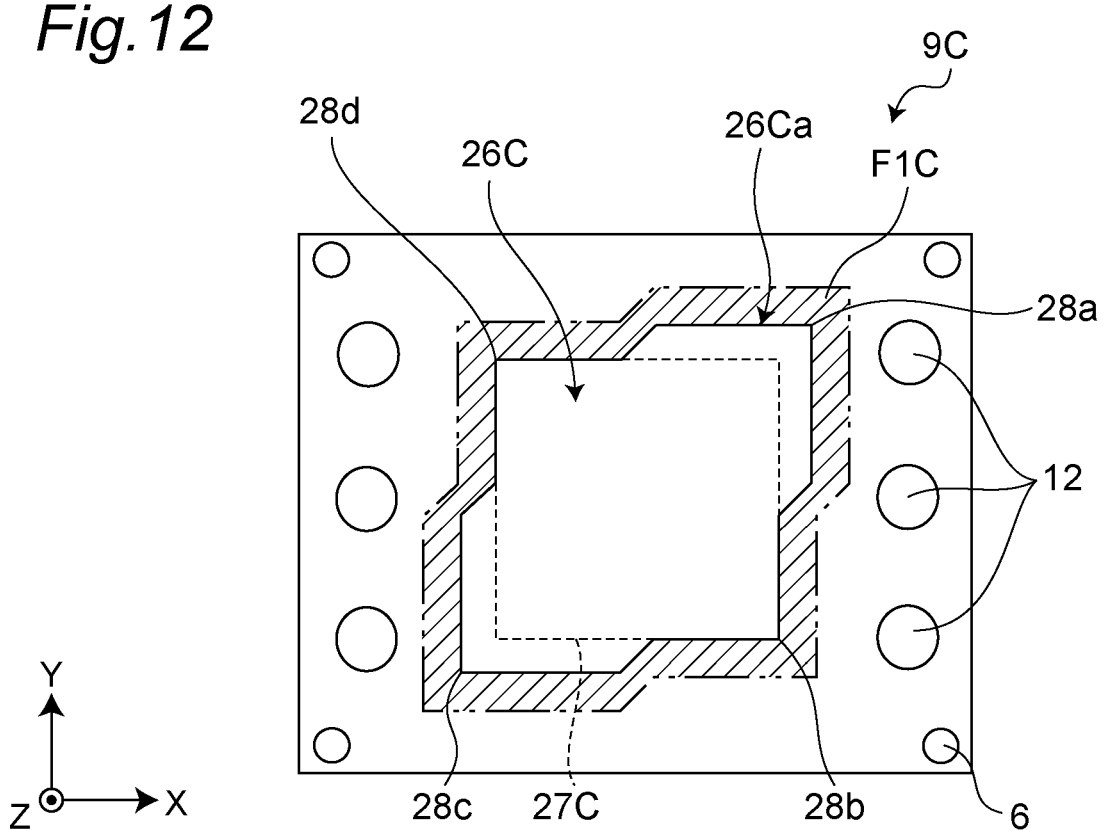
FIG. 12 is a plan view of a cathode sealing member according to a second embodiment of the present disclosure.
Figure 13:
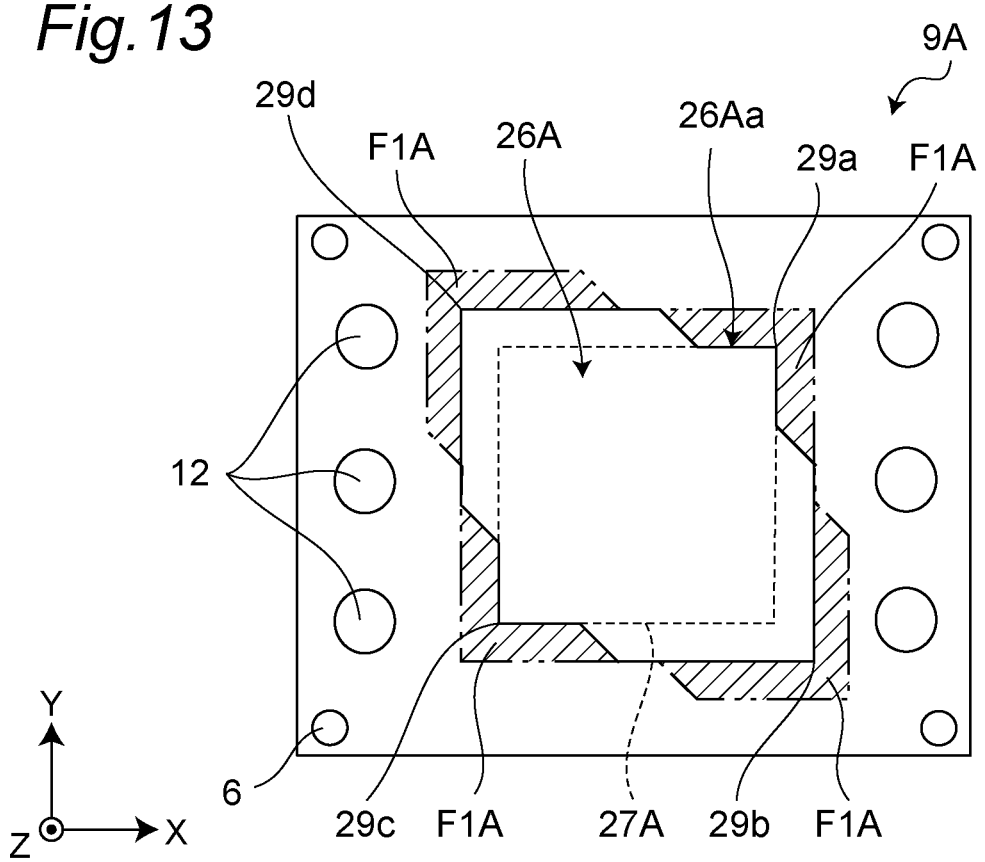
FIG. 13 is a plan view of an anode sealing member according to the second embodiment of the present disclosure.
Figure 14:
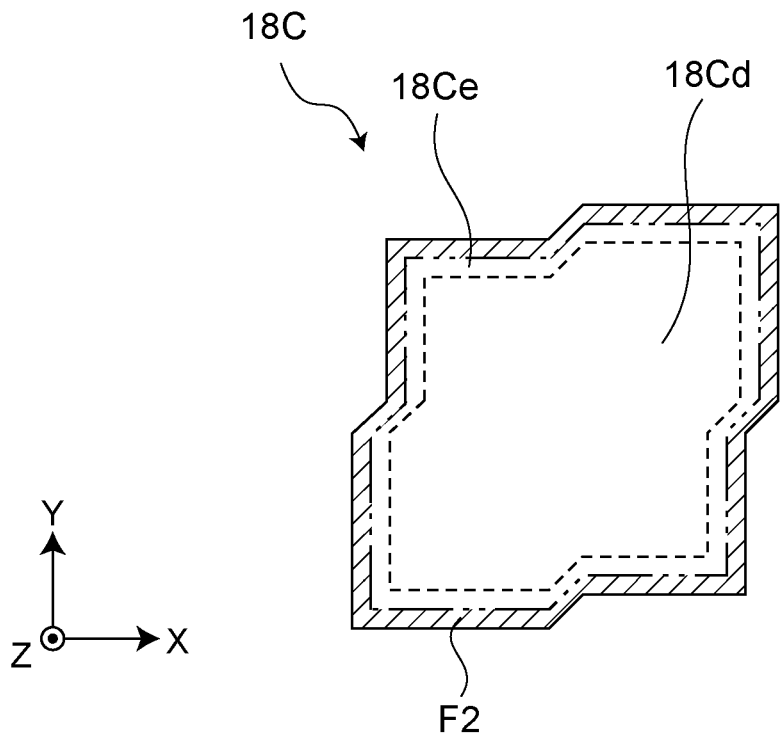
FIG. 14 is a plan view of a cathode gas diffusion layer according to the second embodiment of the present disclosure.
Figure 15:
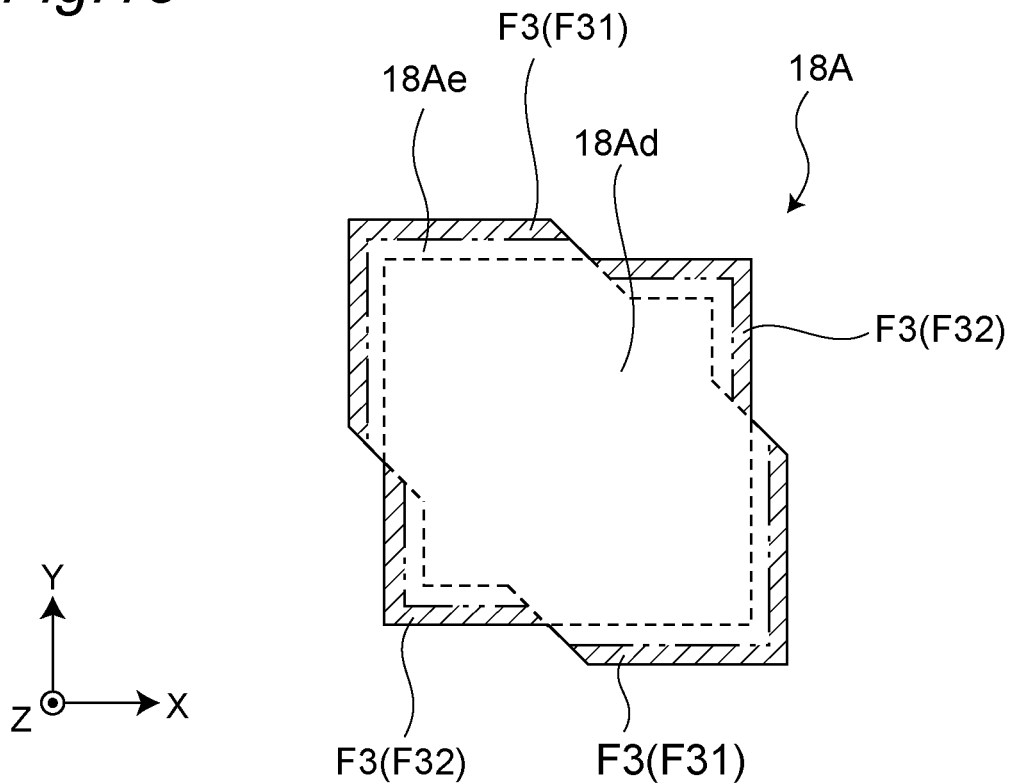
FIG. 15 is a plan view of an anode gas diffusion layer according to the second embodiment of the present disclosure.

FIG. 12 is a plan view of the cathode sealing member 9C in the fuel cell module 2 according to the second embodiment. FIG. 13 is a plan view of the anode sealing member 9A in the fuel cell module 2 according to the second embodiment. FIG. 14 is a plan view of the cathode gas diffusion layer 18C according to the second embodiment. FIG. 15 is a plan view of the anode gas diffusion layer 18A in the fuel cell module 2 according to the second embodiment.

As shown in FIGS. 12 and 13, the opening portion 26C is disposed in the cathode sealing member 9C, and the opening portion 26A is disposed in the anode sealing member 9A. The opening portion 26C disposed in the cathode sealing member 9C is of a polygonal shape having two opposed vertices 28a and 28c arranged outside of a reference square 27C. The opening portion 26C disposed in the anode sealing member 9A is of a polygonal shape having two opposed vertices 29b and 29d arranged outside of the reference square 27C. The openings 26C and 26A are so formed that, when the cathode sealing member 9C and the anode sealing member 9A are overlapped with each other, the vertices 28a to 28d and the vertices 29a to 29d among vertices of the openings 26C and 26A do not overlap, respectively, although the squares 27C and 27A overlap.

The cathode sealing member 9C covers the outer peripheral portion of the cathode gas diffusion layer 18C so as to overlap in the thickness direction with the cathode gas diffusion layer 18C in a portion including the edge 26Ca of the opening portion 26C within a region F1C of the cathode sealing member 9C. Similarly, the anode sealing member 9A covers the outer peripheral portion of the anode gas diffusion layer 18A in a portion including the edge 26Aa of the opening portion 26A within a region F1A of the anode sealing member 9A. At this time, the arrangement is preferably such that the anode-side inner region F3 and the cathode-side inner region F2 do not overlap in plan view. For example, as shown in FIG. 13, such an arrangement preventing the anode-side inner region F3 and the cathode-side inner region F2 from overlapping can be obtained by forming the region F1A of the anode sealing member 9A from a plurality of separately disposed regions, instead of the continuous region.

As shown in FIGS. 14 and 15, the cathode gas diffusion layer 18C is of the same shape as that of the opening portion 26C of the cathode sealing member 9C but is formed larger than the opening portion 26C. The cathode gas diffusion layer 18C has the first cathode gas diffusion layer 18Ce that is an outer peripheral portion thereof and the second cathode gas diffusion layer 18Cd that is a portion inside the first cathode gas diffusion layer 18Ce. The anode gas diffusion layer 18A is of the same shape as that of the opening portion 26A of the anode sealing member 9A but is formed larger than the opening portion 26A. The anode gas diffusion layer 18A has the first anode gas diffusion layer 18Ae that is an outer peripheral portion thereof and the second anode gas diffusion layer 18Ad that is a portion inside the first anode gas diffusion layer 18Ae. The first cathode gas diffusion layer 18Ce has the cathode-side inner region F2 that is a portion overlapping the cathode sealing member 9C. The anode-side inner region F3 of the first anode gas diffusion layer 18Ae is four non-continuous separate regions, similar to the region F1A of the anode sealing member 9A. As shown in FIG. 15, when viewed from the direction perpendicular to the first main surface 15a, the anode-side inner region F3 has an outer portion F31 lying outside of the cathode-side inner region F2 and an inner portion F32 lying inside of the cathode-side inner region F2.

The first cathode gas diffusion layer 18Ce and the first anode gas diffusion layer 18Ae are formed with a void that is formed from e.g. a serration as in FIG. 6 or through-holes as in FIG. 7. Considering the assembly tolerance, the cathode gas diffusion layer 18C and the cathode sealing member 9C overlap within the range of the region F1C. Similarly, the anode gas diffusion layer 18A and the anode sealing member 9A overlap within the range of the region F1A. By making the gas diffusion layer 18 and the sealing member 9 into shapes as shown in FIGS. 12 to 15, the configuration is achieved where the anode-side inner region F3 and the cathode-side inner region F2 do not overlap in plan view.

Figure 16:
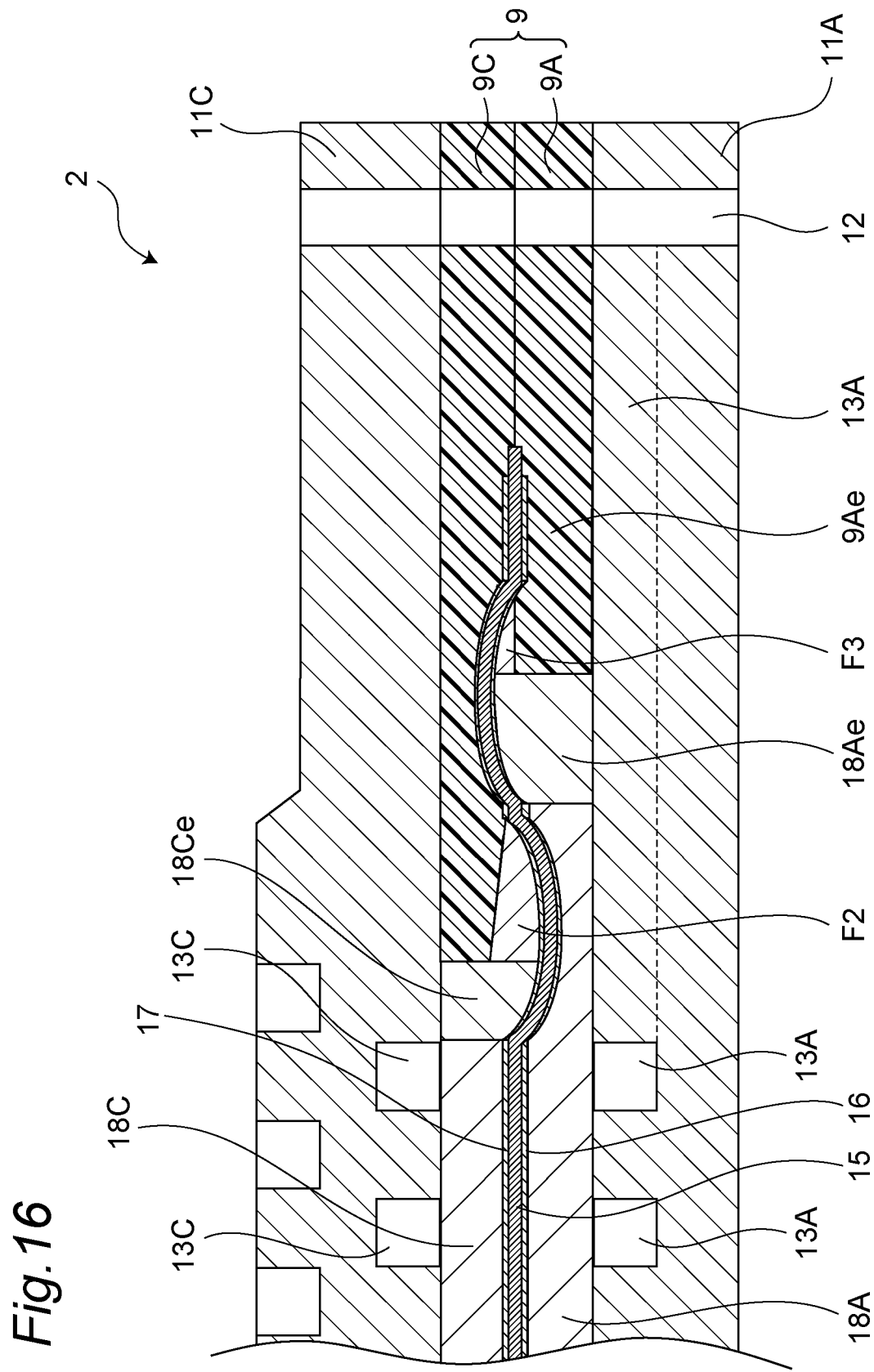
FIG. 16 is a partial sectional view of a fuel cell module according to the second embodiment of the present disclosure.

FIG. 16 is a sectional view of the fuel cell module 2 in the second embodiment. The anode sealing member 9A and the cathode sealing member 9C have portions coming into contact with the fuel gas flow path groove 13A and the oxidizer gas flow path groove 13C when bonding the anode separator 11A and the cathode separator 11C. Since fiber sheet enclosed in insulating resin is used for the sealing member 9, resin of the anode sealing member 9A may possibly melt and block the fuel gas flow path groove 13A. For this reason, it is preferred to harden in advance resin of a previously-hardened portion 9Ae that is a portion of the anode sealing member 9A coming into contact with the fuel gas flow path groove 13A. At this time, stress concentration can be suppressed by positioning the cathode-side inner region F2 that is a region where the cathode sealing member 9C and the cathode gas diffusion layer 18C overlap, on the inner side in the plane direction of the previously-hardened portion.

On the other hand, the previously-hardened portion (not shown) is disposed also in a portion where the cathode sealing member 9C *comes* into contact with the oxidizer gas flow path groove 13C. In this case, the anode-side inner region F3 is preferably positioned inside of the previously-hardened portion of the cathode sealing member 9C.

In the fuel cell module 2 according to the second embodiment, when viewed from the direction perpendicular to the first main surface 15a, the anode-side inner region F3 of the anode gas diffusion layer 18A has the outer portion F31 lying outside of the cathode-side inner region F2 of the cathode gas diffusion layer 18C and the inner portion F32 lying inside of the cathode-side inner region F2 of the cathode gas diffusion layer 18C. In other words, when viewed from the direction perpendicular to the first main surface 15a, the anode-side inner region F3 and the cathode-side inner region F2 do not have an overlapping region.

According to this configuration, even if misalignment between constituent members occurs due to assembly, the cathode gas diffusion layer 18C and the cathode sealing member 9C do not overlap in plan view and the anode gas diffusion layer 18A and the anode sealing member 9A do not overlap in plan view. For this reason, breakage of the constituent members of the fuel cell module 2 due to stress concentration can be prevented.

Although in this embodiment the region F1A of the anode sealing member 9A and the anode-side inner region F3 are non-continuous separate regions, the region F1C of the cathode sealing member 9C and the cathode-side inner region F2 may also have the same configuration. That is, the cathode-side inner region F2 may have an outer portion lying outside of the anode-side inner region F3 and an inner portion lying inside of the anode-side inner region F3.

Although in this embodiment the shape of the opening portion 26A of the anode sealing member 9A and of the opening portion 26C of the cathode sealing member 9C is a polygon, the shape of the openings 26A and 26C is not limited thereto. For example, it may be an ellipse or the like.

Third Embodiment

Figure 17:
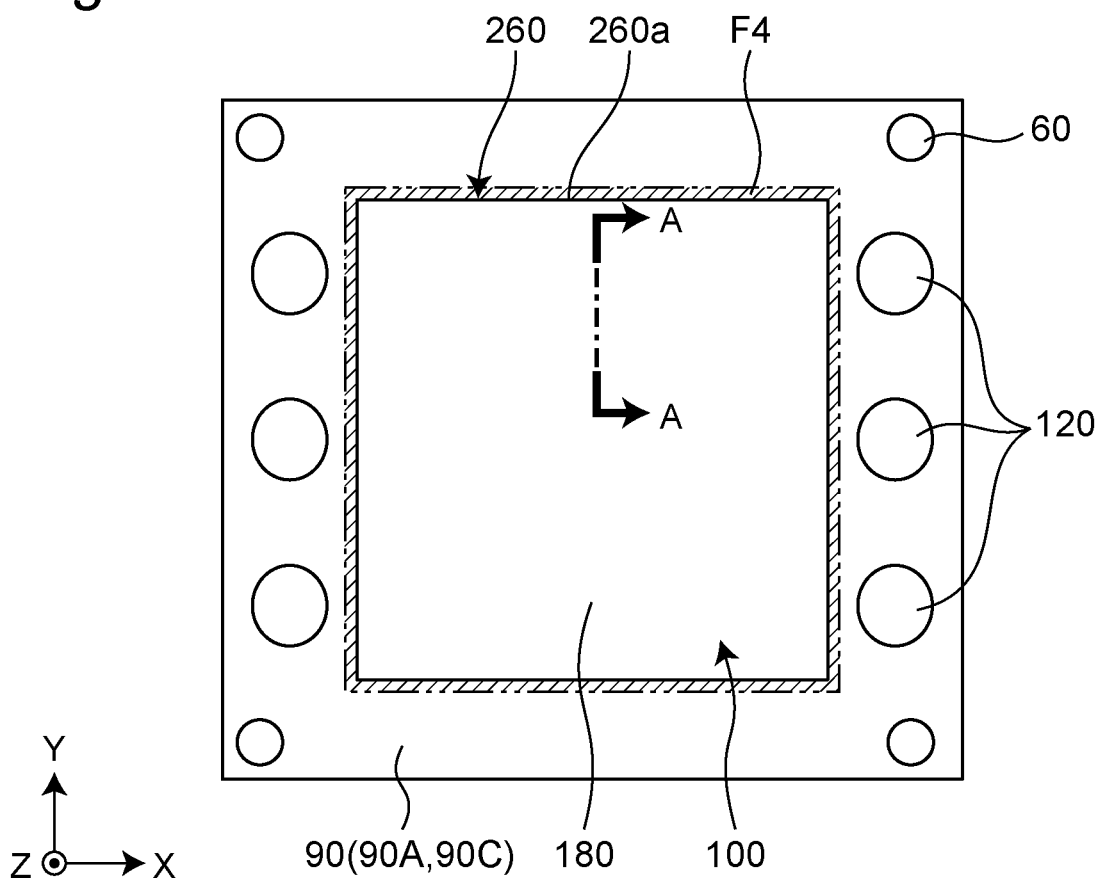
FIG. 17 is a plan view of an electrolyte membrane-electrode assembly and a sealing member in a fuel cell module according to a third embodiment of the present invention.
Figure 18:
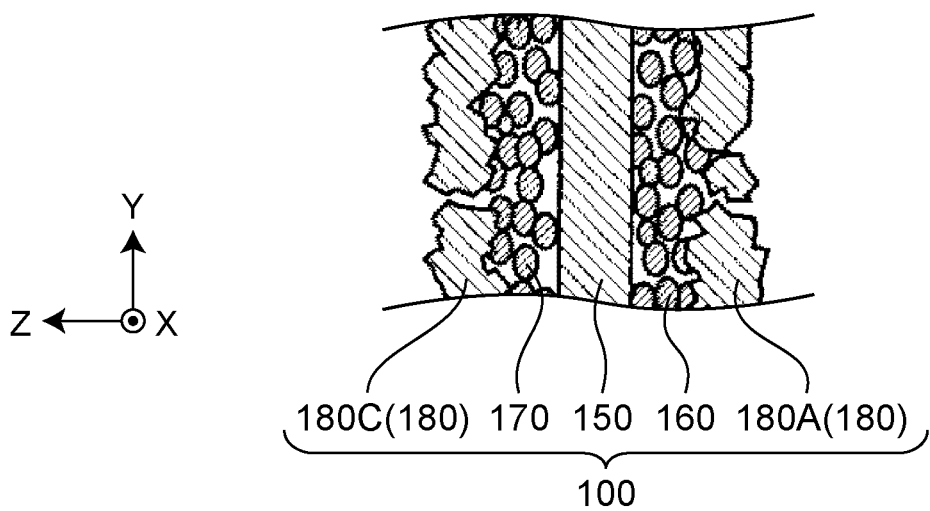
FIG. 18 is a sectional view taken along line A-A of the electrolyte membrane-electrode assembly of FIG. 17.

A fuel cell module according to a third embodiment of the present disclosure will be described. FIG. 17 is a plan view of an MEA 100 and a sealing member 90 in a fuel cell module 20, viewed from the outside in the thickness direction. FIG. 18 is a sectional view taken along line A-A of the MEA 100 of FIG. 17. In the plan view of FIG. 17 and the partial sectional view of FIG. 18, a configuration of the MEA 100 is shown where the sealing member 90 is disposed on a separator 110 and on a peripheral edge portion of the MEA 100. Arrangement is such that the sealing member 90 having bolt holes 60 and manifold holes 120 prevents the outer edge portion of the MEA 100 from being exposed.

The sealing member 90 is so disposed as to overlap in the thickness direction with at least one gas diffusion layer 180 of a pair of gas diffusion layers 180A and 180C. Specifically, the sealing member 90 is so disposed that, in a region including a center-side edge of the sealing member 90, it overlaps in the thickness direction with at least one gas diffusion layer 180 of the pair of gas diffusion layers 180A and 180C. As used herein, the center-side edge of the sealing member 90 means an edge on the side where the gas diffusion layer 180 is arranged (toward the center of the gas diffusion layer 180) in the plane direction of the sealing member 90. In this embodiment, the sealing member 90 covers the outer peripheral portion of the gas diffusion layer 180 so as to overlap the gas diffusion layer 180 in the thickness direction within a region F4 including an edge 260a of an opening portion 260. In this embodiment, the region F4 indicates a region to a position apart a predetermined length outward in the plane direction from the edge 260a of the opening portion 260.

Figure 19:
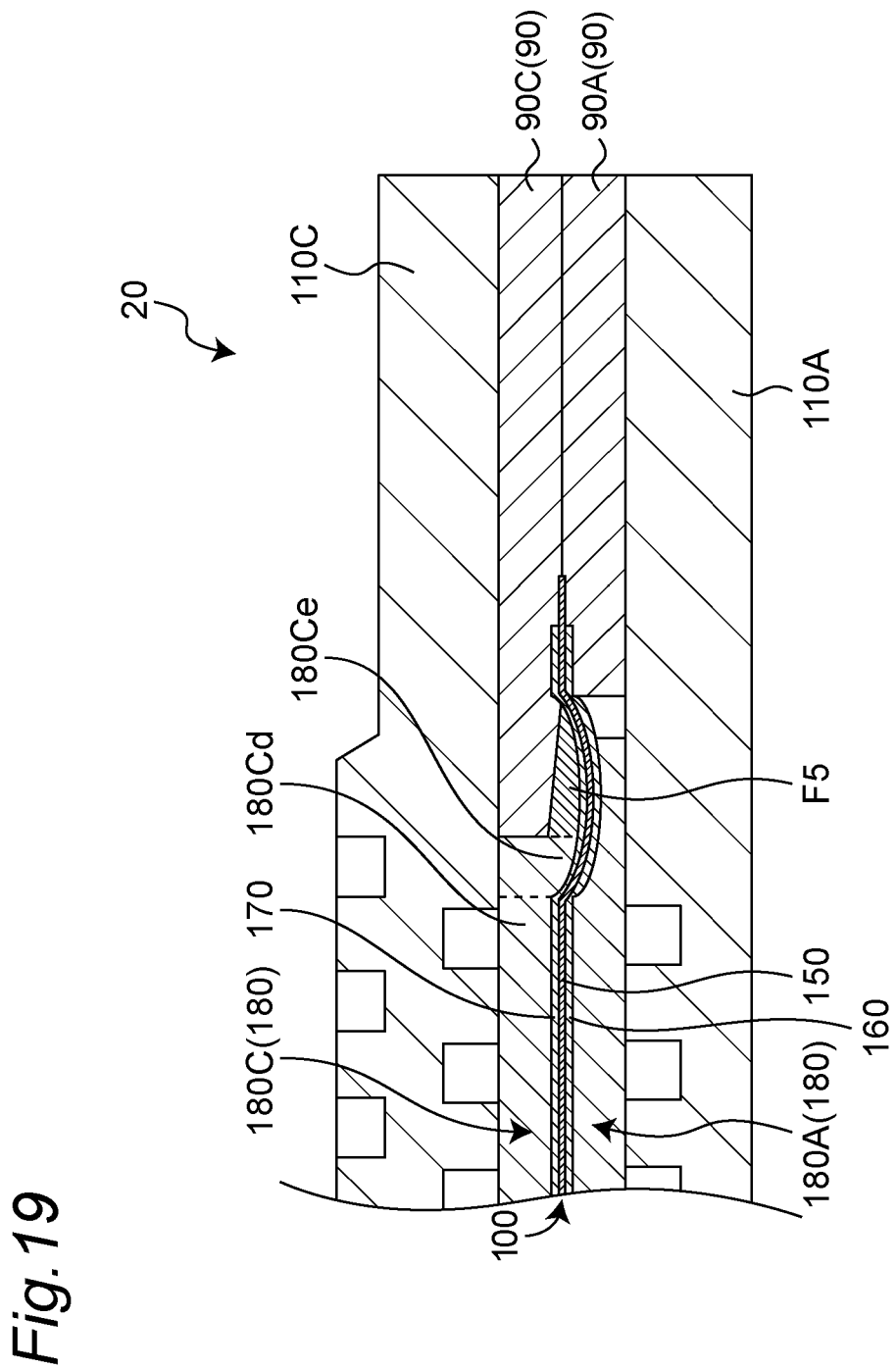
FIG. 19 is a partial sectional view of the fuel cell module according to the third embodiment of the present invention.
Figure 20:
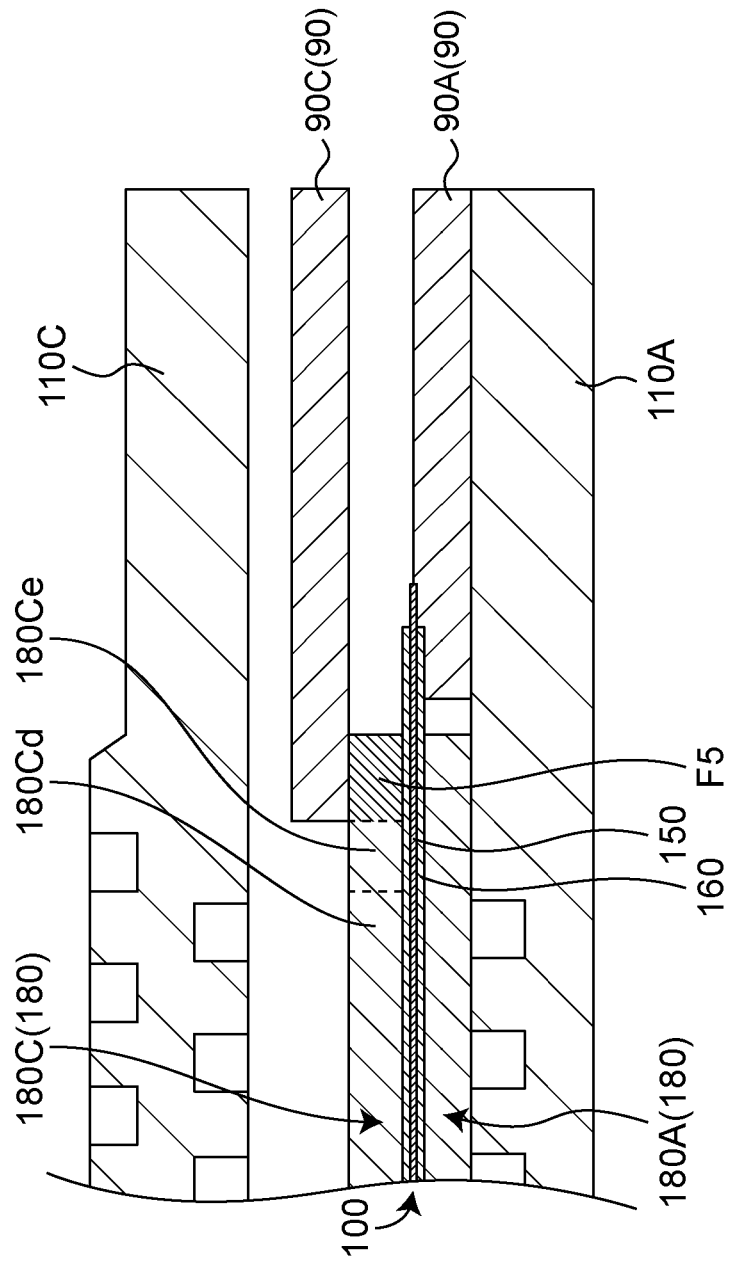
FIG. 20 is a partial sectional view showing a positional relationship of fuel cell module members according to the third embodiment of the present invention.

FIG. 19 shows, in section, a schematic configuration of the fuel cell module 20 in this embodiment. FIG. 20 shows details of the vicinity of a boundary between the gas diffusion layer 180 and the sealing member 90 in schematic section of the outer peripheral portion of one cell among the stacked fuel cell modules 20.

To prevent a polymer electrolyte membrane 150 and catalyst layers 160 and 170 from being exposed on at least one surface, for example, as shown in FIG. 20, the cathode sealing member 90C and the cathode gas diffusion layer 180C are overlapped in the thickness direction of the fuel cell module 20. The configuration will hereinafter be described where the cathode gas diffusion layer 180C and the sealing member 90C overlap. Since the same configuration as in the case of the cathode gas diffusion layer 180C applies to the case where the anode gas diffusion layer 180A and a sealing member 90A overlap, description is omitted herein.

In the state of FIG. 20, clamping is carried out by the cathode separator 110C and the anode separator 110A, as shown in the sectional view of FIG. 19. Prior to clamping the MEA 100 by the cathode separator 110C and the anode separator 110A, the outer peripheral portion of the cathode gas diffusion layer 180C is processed to form a space along the outer periphery. This makes it possible to prevent breakage of the cathode separator 110C caused by stress concentration on the portion where the cathode sealing member 90C and the cathode gas diffusion layer 180C overlap, when subjected to a load in the stacking direction.

The method of processing the outer peripheral portion of the cathode gas diffusion layer 180C may be e.g. a method in which different compositions are imparted to the outer peripheral portion and to the other part when producing the cathode gas diffusion layer 180C. In this embodiment, due to application to the process such as the roll-to-roll process continuously producing in a sheet form in the production of the cathode gas diffusion layer 180C, a method is used where the outer peripheral portion is processed at a step of punching the continuously formed sheet-like one with a uniform composition into a predetermined size.

Figure 21:
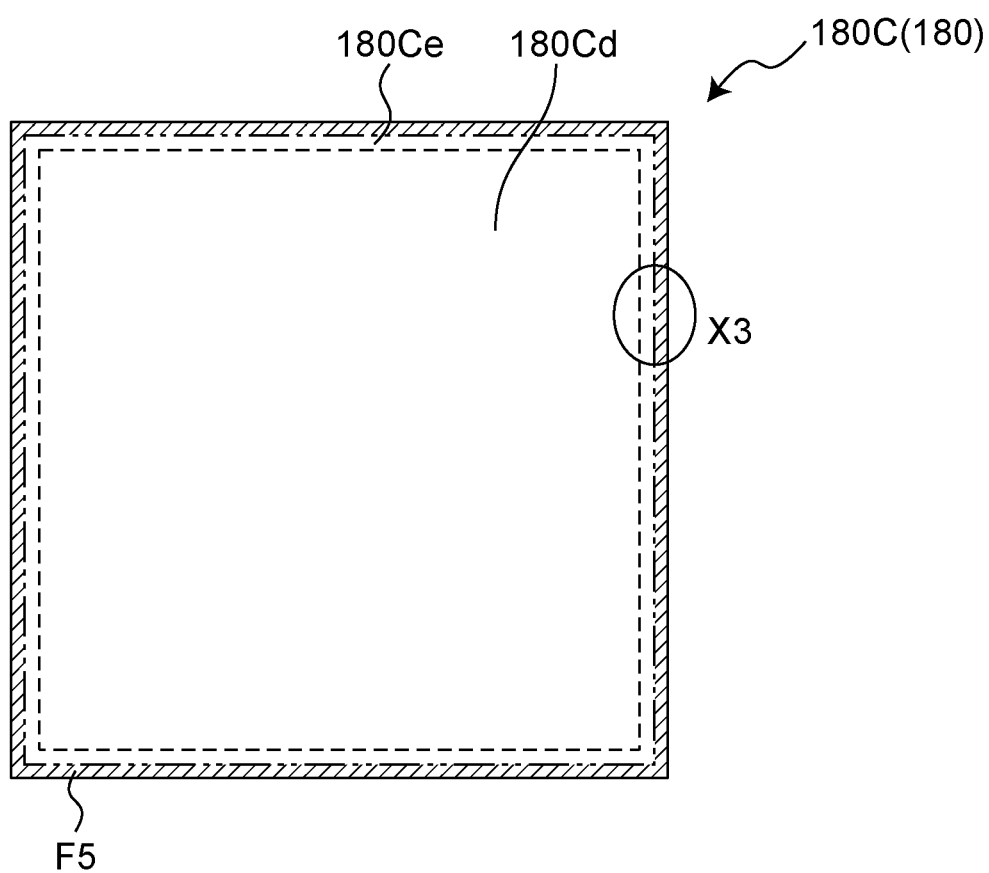
FIG. 21 is a plan view of a gas diffusion layer according to the third embodiment of the present invention.
Figure 22:
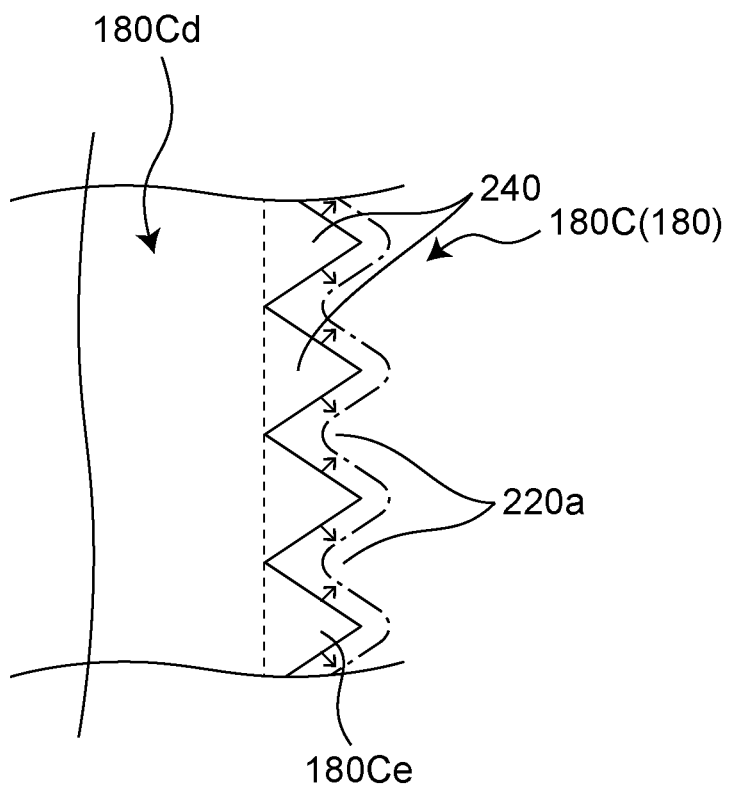
FIG. 22 is a plan view of the gas diffusion layer whose outer peripheral portion is processed into a serrated shape.
Figure 23:
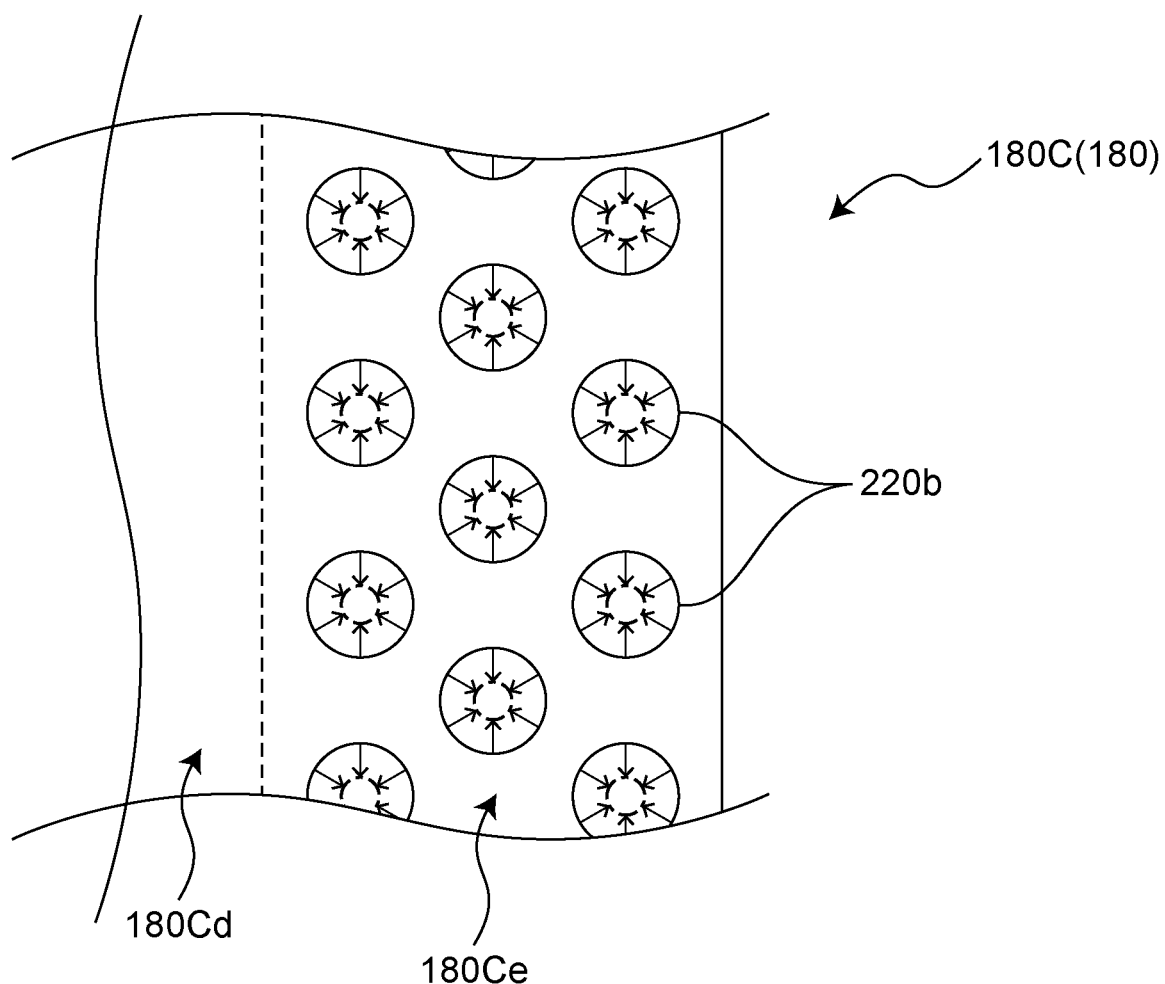
FIG. 23 is a plan view of the gas diffusion layer whose outer peripheral portion is processed to have through-holes.

Referring then to FIGS. 21 to 23, the cathode gas diffusion layer 180C (gas diffusion layer 180) will be described in detail. FIG. 21 is a plan view of the cathode gas diffusion layer 180C. FIG. 22 is an enlarged view of a portion X3 of FIG. 21 in the case where the outer peripheral portion of the cathode gas diffusion layer 180C is processed into a serrated shape. FIG. 23 is an enlarged view of the portion X3 of FIG. 21 in the case where the outer peripheral portion of the cathode gas diffusion layer 180C is processed with through-holes 220*b*. For the sake of explanation, some emphasized portions are included in FIGS. 21 to 23.

A portion corresponding to the region F4 (FIG. 17) of the cathode gas diffusion layer 180C is partly notched through in the thickness direction. The portion corresponding to the region F4 (FIG. 17) of the cathode gas diffusion layer 180C refers to an inner region F5 of the cathode gas diffusion layer 180C that lies inside (toward the polymer electrolyte membrane 150) in the thickness direction of the region F4. The inner region F5 is a region including a space(s) 220*a* or 220*b* that will be described later.

As shown in FIG. 21, the cathode gas diffusion layer 180C (gas diffusion layer 180) has a first diffusion layer 180Ce and a second diffusion layer 180Cd.

The first diffusion layer 180Ce is formed at an outer peripheral portion of the cathode gas diffusion layer 180C. Specifically, the first diffusion layer 180Ce is a portion lying at an outermost layer in the plane direction of cathode gas diffusion layer 180C. More specifically, the first diffusion layer 180Ce is a portion having the space(s) 220*a* or 220*b* described later formed along the outer periphery of the outer peripheral portion of the cathode gas diffusion layer 180C. The cathode gas diffusion layer 180C is disposed so as to overlap in the thickness direction with the sealing member 90C in at least a part of the outer peripheral portion. In this embodiment, the first diffusion layer 180Ce includes the inner region F5 in a part of the outer peripheral region. That is, the sealing member 90A overlaps in the thickness direction with a part of the first diffusion layer 180Ce. When the MEA 100 and the sealing members 90A and 90C are sandwiched by the pair of separators 110A and 110C, the first diffusion layer 180Ce and the sealing member 90C becomes arranged in an overlapped manner (see FIG. 20).

The second diffusion layer 180Cd is a portion adjacent inside the first diffusion layer 180Ce in the plane direction. In this embodiment, the first diffusion layer 180Ce and the second diffusion layer 180Cd are formed with a uniform composition.

The first diffusion layer 180Ce is disposed at intervals in the inner region F5 (FIG. 19). For example, as shown in FIG. 22, the first diffusion layer 180Ce has in the inner region F5 a serrated portion 240 formed in a saw teeth shape in plan view. In the first diffusion layer 180Ce, a space 220*a* is formed along the serrated portion 240. In this embodiment, the serrated portion 240 is disposed over the entire outer periphery of the first diffusion layer 180Ce. As used herein, "in plan view" refers to the state viewed from the thickness direction.

For example, as shown in FIG. 23, the first diffusion layer 180Ce may have a plurality of through-holes (spaces) 220*b* in the inner region F5 (FIG. 19). The through-holes 220*b* are holes passing through the first diffusion layer 180Ce in the thickness direction. For example, the through-holes 220*b* are formed in a circular shape in plan view. For example, the through-holes 220 are evenly disposed along the outer periphery of the first diffusion layer 180Ce.

When pressing and fastening the outer peripheral portion (first diffusion layer 180Ce) of the cathode gas diffusion layer 180C and the cathode sealing member 90C arranged in an overlapped manner, a load acts in the thickness direction on the first diffusion layer 180Ce. At this time, as shown in FIG. 22 or 23, the first diffusion layer 180Ce is easily deformed and compressed in the plane direction toward the space(s) 220*a* or 220*b* (e.g. in the direction indicated by arrows). In FIGS. 22 and 23, the solid line indicates an outer edge of the first diffusion layer 180Ce before deformation, while the one-dot chain line indicates the outer edge of the first diffusion layer 180Ce after deformation. In FIG. 22, the first diffusion layer 180Ce deforms so as to narrow the space 220*a* defined along the serrated portion 240. In FIG. 23, the first diffusion layer 180Ce deforms toward the inside of the through-holes 220*b* so as to reduce the size of the through-holes 220*b*. Due to deformation of the first diffusion layer 180Ce in the plane direction, a force becomes hard to act in the thickness direction on the first diffusion layer 180Ce. For this reason, stress concentration can be relieved on the portion where the cathode sealing member 90C and the cathode gas diffusion layer 180C overlap. This can prevent breakage of the cathode separator 110C.

Thus, in the fuel cell module 20 according to this embodiment, even if the outer peripheral portion (first diffusion layer 180Ce) of the cathode gas diffusion layer 180C and the cathode sealing member 90C are arranged in an overlapped manner, pressed, and fastened together, breakage of the members arising from the stress concentration can be prevented. Accordingly, exposure of the catalyst layer can be prevented.

The width of processing of the outer peripheral portion of the cathode gas diffusion layer 180C is determined in view of the misalignment accuracy seen when arranging the cathode gas diffusion layer 180C and the cathode sealing member 90C in an overlapped manner. Specifically, to prevent breakage of the members even if the misalignment accuracy deteriorates and the amount of misalignment increases, the processing width is determined so that the cathode gas diffusion layer 180C and the cathode sealing member 90C do not overlap in unprocessed portions. The processing width is determined so that there is no gap between the cathode gas diffusion layer 180C and the cathode sealing member 90C in order to prevent deterioration, rupture, etc. of the polymer electrolyte membrane 150.

For example, if the arrangement accuracy of the cathode sealing member 90C with respect to the cathode gas diffusion layer 180C is ±0.5 mm, design is made so that the overlapping region remains even when the overlapping dimension is reduced by 1 mm in the case of maximum overlapping. For example, in the case of minimum overlapping of 0.2 mm, breakage of the members can be prevented by processing the outer peripheral portion of 1.2 mm or more.

Figure 24:
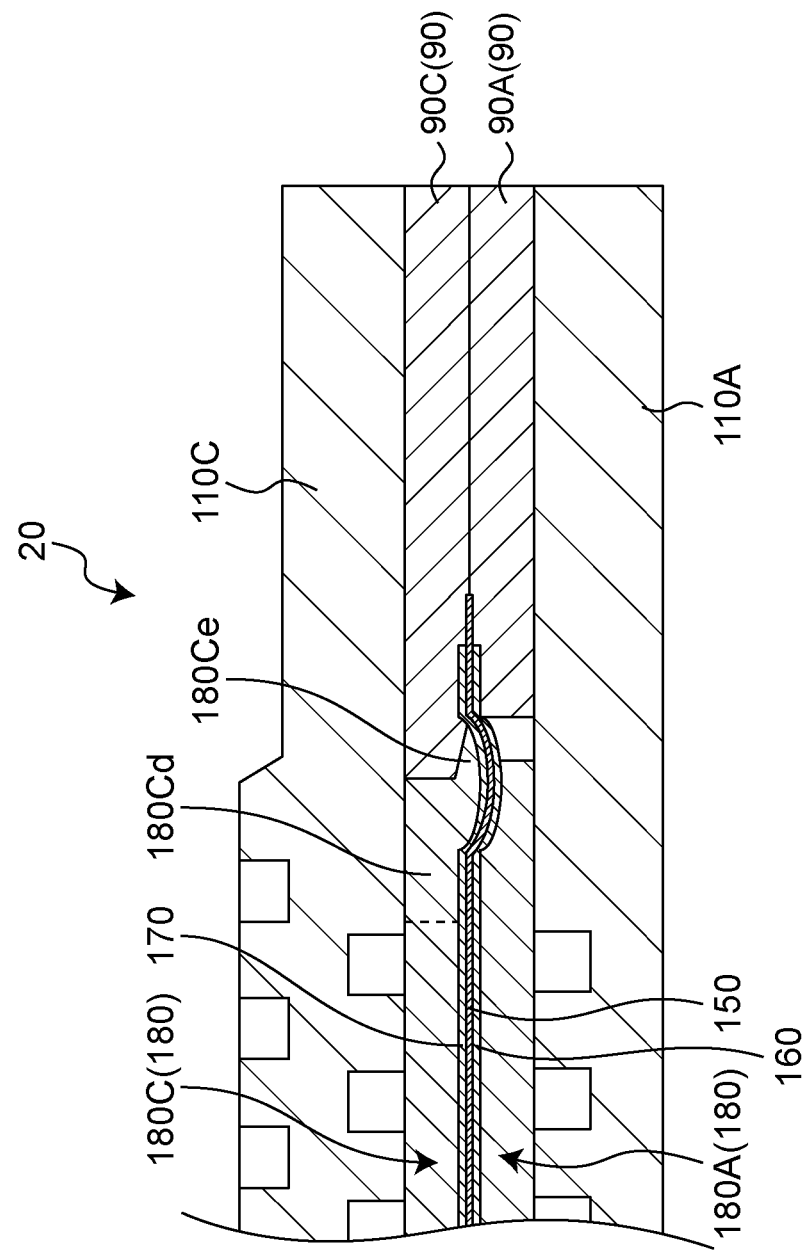
FIG. 24 is a partial sectional view of the fuel cell module according to the third embodiment of the present invention.

When the case of maximum overlapping is FIG. 19 described above, a schematic section in the case of minimum overlapping is shown in FIG. 24. Although deformation of the cathode gas diffusion layer 180C becomes small as compared with the case of maximum overlapping, it is possible in either case to eliminate the gap in the plane direction between the cathode gas diffusion layer 180C and the sealing member 90.

Figure 25:
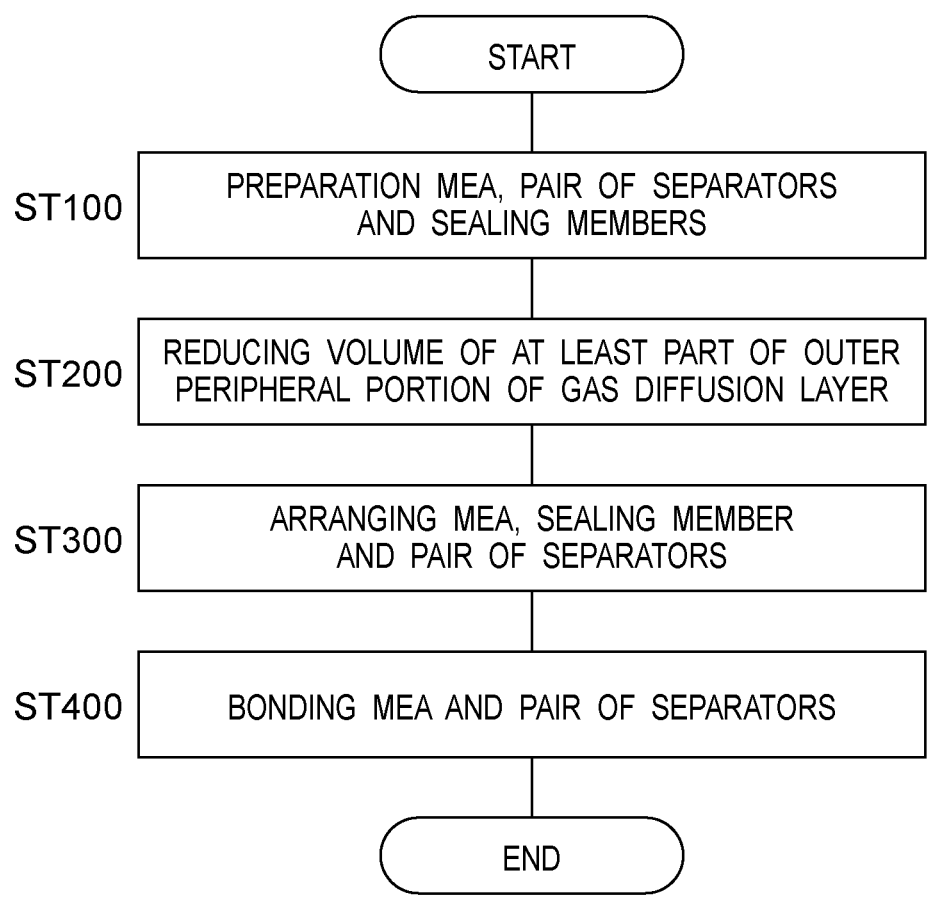
FIG. 25 is an exemplary flowchart of a manufacturing method of the fuel cell module according to the third embodiment of the present disclosure.

Referring then to FIG. 25, a manufacturing method of the fuel cell module 20 will be described. FIG. 25 shows an exemplary flowchart of the manufacturing method of the fuel cell module 20. As shown in FIG. 25, the manufacturing method of the fuel cell module 20 includes a preparation step ST100, a gas diffusion layer processing step ST200, an arrangement step ST300, and a bonding step ST400.

Prepared at the preparation step ST100 are the polymer electrolyte membrane 150 disposed with the anode catalyst layer 160 and the cathode catalyst layer 170, the pair of gas diffusion layers 180A and 180C, the pair of sealing members 90A and 90C, and the pair of separators 110A and 110C.

At the gas diffusion layer processing step ST200, the volume of at least a part of the outer peripheral portion is reduced in at least one gas diffusion layer 180 (e.g. cathode gas diffusion layer 180C) of the pair of gas diffusion layers 180A and 180C. The at least one gas diffusion layer 180 is subjected to e.g. punching, to reduce the volume of at least a part of the outer peripheral portion. For example, the volume is reduced by cutting out the outer periphery in a serrated shape, as shown in FIG. 22, when punching into a rectangular shape. Alternatively, the volume may be reduced e.g. by disposing the plurality of through-holes 220b over the entire outer peripheral portion at the time punching, as shown in FIG. 23.

At the arrangement step ST300, the MEA 100 including the pair of gas diffusion layers 180A and 180C and the sealing member 90 are arranged such that the outer peripheral portion of at least one gas diffusion layer 180 overlaps the sealing member 90 at least partly in the thickness direction.

At the bonding step ST400, the sealing members 90A and 90C and the MEA 100 are sandwiched by the pair of separators 110A and 110C, to bond the MEA 100 and the pair of separators 110A and 110B together.

As described above, processing to reduce the volume of a part of the outer peripheral portion of the cathode gas diffusion layer 180C is carried out. The MEA 100 including the cathode gas diffusion layer 180C and the cathode sealing member 90C are then arranged such that the first diffusion layer 180Ce of the cathode gas diffusion layer 180C overlaps the sealing member 90 in the thickness direction. The MEA and the separator 110 are then bonded together by heating the sealing member 90 and the MEA 100 sandwiched by the separator 110 (anode separator 110A and cathode separator 110C). Through these processes, the fuel cell module 20 according to this embodiment is manufactured.

The fuel cell modules 20 formed in this manner are stacked and fastened together to thereby complete the fuel cell stack.

The fuel cell module according to this embodiment comprises the membrane-electrode assembly 100, the pair of separators 110A and 110C, and the sealing member 90. The membrane-electrode assembly 100 includes the polymer electrolyte membrane 150, the anode catalyst layer 160, the cathode catalyst layer 170, and the pair of gas diffusion layers 180A and 180C, one of which is laminated on the anode catalyst layer 160 and the other of which is laminated on the cathode catalyst layer 170. The anode catalyst layer 160 is disposed on the first main surface of the polymer electrolyte membrane 150. The cathode catalyst layer 170 is disposed on the second main surface of the polymer electrolyte membrane 150. The pair of separators 110A and 110C sandwich the membrane-electrode assembly 100 therebetween. The sealing member 90 bonds the membrane-electrode assembly 100 and each of the pair of separators 110A and 110C. In plan view, the sealing member 90 has the opening portion 260 so that one gas diffusion layer 180 of the pair of gas diffusion layers 180A and 180C and the sealing member 90 overlap in the thickness direction within the region F4 including the edge 260a of the opening 260. A part of the portion (inner region F5) corresponding to the region F4 of the one gas diffusion layer 180 is notched through in the thickness direction.

According to this configuration, since a part of the inner region F5 is notched through in the thickness direction, there can be formed the space(s) 220a or 220b for allowing the first diffusion layer 180Ce to deform in the plane direction. This enables the first diffusion layer 180Ce to deform toward the space(s) 220a or 220b when a load acts in the thickness direction on the first diffusion layer 180Ce. Accordingly, even if a load is applied to the gas diffusion layer 180 and the sealing member 90 overlapping in the thickness direction, stress concentration on the constituent members can be prevented. As a result, even when the outer peripheral portion of the gas diffusion layer 180 and the sealing member 90 overlap, stress concentration on the constituent members can be prevented to suppress deterioration of the polymer electrolyte membrane 150.

The gas diffusion layer 180 on one hand has at its portion (inner region F5) corresponding to the region F4 the plurality of through-holes passing through in the thickness direction.

According to this configuration, when the first diffusion layer 180Ce is subjected to a load in the thickness direction, the first diffusion layer 180Ce can deform toward the through-holes 220B.

The gas diffusion layer 180 on one hand has at its portion (inner region F5) corresponding to the region F4 the serrated portion 240 formed in a saw teeth shape in plan view.

According to this configuration, when the first diffusion layer 180Ce is subjected to a load in the thickness direction, the first diffusion layer 180Ce can deform toward the space 220a defined along the serrated portion 240.

The fuel cell stack according to this embodiment includes the plurality of fuel cell modules 20.

According to this configuration, stress concentration on the members of the fuel cell stack can be prevented.

The manufacturing method of the fuel cell module according to this embodiment includes the processing step ST200, the arrangement step ST300, and the bonding step ST400. At the processing step ST200, the volume of at least a part of the outer peripheral portion is reduced in at least one gas diffusion layer 180 of the pair of gas diffusion layers 180A and 180C. At the arrangement step ST300, the membrane-electrode assembly 100 including the pair of gas diffusion layers 180A and 180C and the sealing member 90 are arranged such that the outer peripheral portion of at least one gas diffusion layer 180 overlaps at least partly with the sealing member 90 in the thickness direction. At the bonding step ST400, the sealing member 90 and the membrane-electrode assembly 100 are sandwiched by the pair of separators 110A and 110C to bond the membrane-electrode assembly 100 and the pair of separators 110A and 110C.

According to this manufacturing method, even when the outer peripheral portion of the gas diffusion layer 180 and the sealing member 90 overlap, stress concentration on the constituent members can be prevented to suppress deterioration of the polymer electrolyte membrane 150.

The present invention is not limited to the above embodiments but can be carried out in various other modes.

Although in the above embodiments the configuration has been exemplified and described where on the cathode side the cathode gas diffusion layer 180C and the cathode sealing member 90C are arranged in an overlapped manner, the fuel cell module 20 is not limited thereto. The configuration may be such that on the anode side the anode gas diffusion layer 180A and the anode sealing member 90A are arranged in an overlapped manner. Specifically, in the anode gas diffusion layer 180A, a part of the portion corresponding to the region F4 may be notched through in the thickness direction. This configuration also enables stress concentration on the constituent members to be prevented to suppress deterioration of the polymer electrolyte membrane 150 even when the outer peripheral portion of the gas diffusion layer 180 and the sealing member 90 overlap.

In both the anode gas diffusion layer 180A and the cathode gas diffusion layer 180C, a part of the portion corresponding to the region F4 may be notched through in the thickness direction. This configuration also enables stress concentration on the constituent members to be prevented to suppress deterioration of the polymer electrolyte membrane 150 even when the outer peripheral portion of the gas diffusion layer 180 and the sealing member 90 overlap.

Although in at least one gas diffusion layer 180 the volume of at least a part of the outer peripheral portion has been reduced by punching, the punching is not limitative as long as the volume of at least a part of the outer peripheral portion can be reduced.

Although the first diffusion layer 180Ce has had the serrated portion 240 formed in a saw teeth shape in plan view, this is not limitative as long as a part of the portion corresponding to the region F4 is notched through in the thickness direction in at least one gas diffusion layer 180 of the pair of gas diffusion layers 180A and 180C. For example, the first diffusion layer 180Ce may be formed so as to curve in the plane direction along the outer periphery. This configuration also enables stress concentration on the constituent members to be prevented even if a load is applied to the gas diffusion layers 180A and 180C and the sealing members 90A and 90C overlapping in the thickness direction.

Although the through-holes 220b has been formed in a circular shape in plan view, this is not limitative. The shape of the through-holes 220b may be another shape such as e.g. an ellipse or a polygon in plan view.

Although the sealing member 90A has overlapped in the thickness direction with a part of the first diffusion layer 180Ce, the sealing member 90A may overlap in the thickness direction with the entire first diffusion layer 180Ce in plan view. That is, the inner edge (two-dot chain line of FIG. 21) of the inner region F5 and the inner edge (dotted line of FIG. 21) of the first diffusion layer 180Ce may coincide in plan view.

INDUSTRIAL APPLICABILITY

According to the fuel cell module and the fuel cell stack, and the fuel cell module manufacturing method of the present disclosure, a highly durable and thin fuel cell module can be implemented while suppressing external leaks or cross leaks of fuel gas and oxidizer gas. It is thus useful as a fuel cell for use in a portable power supply, an electric vehicle power supply, a home cogeneration system, or the like.

EXPLANATIONS OF LETTERS OR NUMERALS

1 fuel cell stack
2, 20 fuel cell module (cell)
3 current collector plate
4 end plate
5 spring
6, 60 bolt hole
7 fastening bolt
8 nut
9, 90 sealing member
9A, 90A anode sealing member
9C, 90C cathode sealing member
9Ae previously-hardened portion
10, 100 MEA (membrane-electrode assembly)
11, 110 separator
11A, 110A anode separator
11C, 110C cathode separator
12, 120 manifold hole
13 gas flow path groove
13A fuel gas flow path groove
13C oxidizer gas flow path groove
13W cooling water flow path groove
15, 150 polymer electrolyte membrane
16, 160 anode catalyst layer
17, 170 cathode catalyst layer
18, 180 gas diffusion layer
18A, 180A anode gas diffusion layer
18C, 180C cathode gas diffusion layer
18Ad second anode gas diffusion layer
18Ae first anode gas diffusion layer
18Cd second cathode gas diffusion layer
18Ce first cathode gas diffusion layer
180Ce first diffusion layer
180Cd second diffusion layer
22a, 220a void
220b through-hole
22Ab through-hole
22Cb through-hole
24A serrated portion
24C serrated portion
240 serrated portion
26A opening portion
26C opening portion
260 opening
26Aa edge
26Ca edge
260a edge
F1, F4 region
F2 cathode-side inner region
F3 anode-side inner region
F5 inner region

The invention claimed is:

1. A fuel cell module comprising:
   a membrane-electrode assembly including
      a polymer electrolyte membrane,
      an anode catalyst layer disposed on a first main surface of the polymer electrolyte membrane,
      a cathode catalyst layer disposed on a second main surface of the polymer electrolyte membrane, and
      a pair of gas diffusion layers, one of which is laminated on the anode catalyst layer and the other of which is laminated on the cathode catalyst layer;
   a pair of separators sandwiching the membrane-electrode assembly therebetween; and
   a sealing member bonding and sealing the membrane-electrode assembly and each of the pair of separators together,
   wherein an overlapping region is provided in which one gas diffusion layer of the pair of gas diffusion layers and the sealing member overlap each other in a thickness direction, the overlapping region including a center-side edge of the sealing member, the one gas diffusion layer has a first surface and a second surface, the first and second surfaces being disposed on opposite sides of the one gas diffusion layer with respect to the thickness direction, and the one gas diffusion layer is notched so as to penetrate between the first surface and the second surface in the thickness direction at a portion of the one gas diffusion layer within the overlapping region, and wherein the portion of the one gas diffusion layer within the overlapping region includes a serrated portion formed in a saw teeth shape in plan view.

2. The fuel cell module according to claim 1, wherein the portion of the one gas diffusion layer within the overlapping region includes a plurality of through-holes passing through in the thickness direction, and respective sizes of the through-holes are larger than a thickness of the one gas diffusion layer.

3. The fuel cell module according to claim 1, wherein the pair of gas diffusion layers are an anode gas diffusion layer laminated on the anode catalyst layer and a cathode gas diffusion layer laminated on the cathode catalyst layer, the pair of separators are an anode separator arranged toward the anode gas diffusion layer of the membrane-electrode assembly and a cathode separator arranged toward the cathode gas diffusion layer of the membrane-electrode assembly, the cathode separator and the anode separator in pairs sandwiching the membrane-electrode assembly therebetween, and the sealing member includes:

an anode sealing member having an opening portion, the anode sealing member bonding and sealing the membrane-electrode assembly and the anode separator together; and a cathode sealing member having an opening portion, the cathode sealing member bonding and sealing the membrane-electrode assembly and the cathode separator together, wherein when viewed from a direction perpendicular to the first main surface, the anode gas diffusion layer has an anode-side inner region overlapping the anode sealing member at a region including an edge toward the opening portion of the anode sealing member, when viewed from the direction perpendicular to the first main surface, the cathode gas diffusion layer has a cathode-side inner region overlapping the cathode sealing member at a region including an edge toward the opening portion of the cathode sealing member, the anode gas diffusion layer has a void passing through in the thickness direction of the anode gas diffusion layer in at least a part including the anode-side inner region, the cathode gas diffusion layer has a void passing through in the thickness direction of the cathode gas diffusion layer in at least a part including the cathode-side inner region, and when viewed from the direction perpendicular to the first main surface, the anode-side inner region and the cathode-side inner region do not overlap.

4. The fuel cell module according to claim 3, wherein when viewed from the direction perpendicular to the first main surface, the anode-side inner region has an outer portion lying outside of the cathode-side inner region and an inner portion lying inside of the cathode-side inner region.

5. The fuel cell module according to claim 3, wherein at least one of the void formed in the anode gas diffusion layer and the void formed in the cathode gas diffusion layer includes a plurality of through-holes.

6. The fuel cell module according to claim 3, wherein at least one of the void formed in the anode gas diffusion layer and the void formed in the cathode gas diffusion layer is formed by a saw-toothed notch when viewed from the direction perpendicular to the first main surface.

7. A fuel cell stack comprising a plurality of fuel cell modules connected in series, each fuel cell module of the plurality of fuel cell modules being the fuel cell module according to claim 1.

* * * * *